United States Patent [19]

Hoang et al.

[11] Patent Number: 5,719,632
[45] Date of Patent: Feb. 17, 1998

[54] MOTION VIDEO COMPRESSION SYSTEM WITH BUFFER EMPTY/FILL LOOK-AHEAD BIT ALLOCATION

[75] Inventors: Dzung Tien Hoang, Durham, N.C.; Elliot Neil Linzer, Bronx, N.Y.

[73] Assignee: IBM Corporation, Armonk, N.Y.

[21] Appl. No.: 591,807

[22] Filed: Jan. 25, 1996

[51] Int. Cl.⁶ .............................. H04N 7/12; H04N 11/02
[52] U.S. Cl. .................................. 348/419; 348/405
[58] Field of Search ...................... 348/405, 419, 348/402, 423; 364/514 R; H04N 7/12, 11/02

[56] References Cited

U.S. PATENT DOCUMENTS

| | | | |
|---|---|---|---|
| 4,302,775 | 11/1981 | Widergren et al. | 348/419 |
| 5,231,484 | 7/1993 | Gonzales et al. | 348/419 |
| 5,510,840 | 4/1996 | Yonemitsu | 348/402 |
| 5,565,924 | 10/1996 | Haskell et al. | 348/423 |
| 5,623,424 | 4/1997 | Azadegan et al. | 364/514 R |

*Primary Examiner*—Tommy P. Chin
*Assistant Examiner*—Luanne Din
*Attorney, Agent, or Firm*—Daniel P. Morris, Esq.

[57] ABSTRACT

Systems and methods are provided for allocating bits to pictures in accordance with the bit allocation constraints for operation at both constant and variable bit rates. The encoding complexity of each picture is modeled based on its spatial and temporal properties. Based on the modeling, a number of bits is allocated in advance to each picture. Each picture is then compressed according to the bits allocated. Based on the difference between the achieved and desired bit rates and on the availability of computational resources, a second pass or multiple passes may be performed to improve the coding.

20 Claims, 17 Drawing Sheets

FIG. 21

| PICTURE | COMPLEXITY | OVERHEAD |
|---|---|---|
| 1 | 1700000 | 37500 |
| 2 | 960000 | 15000 |
| 3 | 540000 | 10000 |
| 4 | 600000 | 25000 |
| 5 | 2100000 | 50000 |

FIG. 22

| k | TOP [k] BITS | BOT [k] BITS |
|---|---|---|
| 1 | (50000) | (250000) |
| 2 | (163722, 86278) | (250000, 200000) |
| 3 | (243359, 131250, 75391) | (250000, 200000, 200000) |
| 4 | (250000, 175000, 100000, 125000) | (250000, 200000, 182895, 217105) |

FIG. 23

| k | TOP [k] Q | BOT [k] Q |
|---|---|---|
| 1 | (136) | (8) |
| 2 | (13.47, 13.47) | (8, 5.19) |
| 3 | (8.26, 8.26, 8.26) | (8, 5.19, 2.84) |
| 4 | (8, 6, 6, 6) | (8, 5.19, 3.12, 3.12) |

FIG. 24

| PICTURE | BITS | Q |
|---|---|---|
| 1 | 250000 | 8 |
| 2 | 175000 | 6 |
| 3 | 100000 | 6 |
| 4 | 125000 | 6 |
| 5 | 350000 | 7 |

FIG. 25

| PICTURE | BITS | Q |
|---|---|---|
| 1 | 250000 | 8 |
| 2 | 152143 | 7 |
| 3 | 87143 | 7 |
| 4 | 110714 | 7 |
| 5 | 350000 | 7 |

MOTION VIDEO COMPRESSION SYSTEM WITH BUFFER EMPTY/FILL LOOK-AHEAD BIT ALLOCATION

I. BACKGROUND OF THE INVENTION a. Field of the Invention

The present invention relates to the field of data compression and, more particularly, to systems and methods for compressing digital motion video signals.

b. Related Art

Technological advances in digital transmission networks, digital storage media, Very Large Scale Integration devices, and digital processing of video and audio signals are converging to make the transmission and storage of digital video economical in many applications. Because the storage and transmission of digital video signals are central to many applications, and because an uncompressed representation of a video signal typically requires a large amount of storage, the use of digital video compression techniques is important to this advancing art.

Several international standards for the compression of digital video signals have emerged over the past decade, with more currently under development. These standards apply to algorithms for the transmission and storage of compressed digital video in a variety of applications, including: video-telephony and teleconferencing; high-quality digital television transmission via coaxial networks, fiber-optic networks, terrestrial broadcast or direct satellite broadcast; and in interactive multimedia products stored on CD-ROM, Digital Tape, Digital Video Disk, and disk drives.

Several of the compression standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms were developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standards specify the syntax of the compressed bit stream and the method of decoding, but leave considerable latitude for novelty and variety in the algorithm employed in the encoder.

The MPEG-1 standard was developed for use in compressing progressive video. A progressive video sequence is a sequence in which each frame represents a scene as it is viewed at a discrete time instance. By contrast, for interlaced video, a field—every other line on the screen—is captured periodically. For interlaced video, at alternating time instances the top and bottom field on a screen is refreshed. At any given time, data from two fields (a frame) can be seen.

The MPEG-2 standard, can be used to compress either interlaced video, progressive video, or a mixture of progressive and interlaced video: the encoder specifies whether each frame is progressive or interlaced.

The MPEG standards specify a bit stream in which the number of bits in the compressed representation of each picture is variable. This variation is due to the different types of picture processing, as well as the inherent variation with time of the spatio-temporal complexity of the scene being coded. This leads to the use of buffers to even out the fluctuations in bit rate. For a constant-bit-rate storage media or transmission channel, for example, buffering allows the bit rate of the compressed pictures to vary within limits that depend on the size of the buffers, while outputting a constant bit rate to the storage device or transmission channel.

Considering the importance of buffering, the MPEG standards define a hypothetical decoder called the Virtual Buffer Verifier (VBV), diagramed in FIG. 1, that verifies whether an encoded bit stream is decodable with specified limitations on the decoder buffer size and the input bit rate. The VBV has two modes of operation: constant bit rate (CBR) and variable bit rate (VBR). The two modes are described below.

For constant-bit-rate operation, the Decoder Buffer 101 is filled at a constant bit rate with compressed data 100 from the storage or transmission medium. Both the buffer size and the bit rate are parameters that are transmitted in the compressed bit stream. After an initial delay, which is also derived from information in the bit stream, a hypothetical decoder 103 instantaneously removes from the buffer all of the data associated with the first picture. Thereafter, at intervals equal to the picture rate of the sequence, the decoder removes all data associated with the earliest picture in the buffer.

Variable-bit-rate operation is similar to the above, except that the compressed bit stream enters the buffer at a specified maximum bit rate until the buffer is full, at which point no more bits are input until the buffer at least partially empties. This translates to a bit rate entering the buffer that is effectively variable.

In order for the bit stream to satisfy the MPEG rate-control requirements, it is necessary that all the data for each picture be available within the buffer at the instant it is needed by the decoder. This requirement translates to upper and lower bounds ($U_{VBV}$ and $L_{VBV}$) on the number of bits allowed in each picture. The upper and lower bounds for a given picture depend on the number of bits used in all the pictures preceding it. It is the function of the encoder to produce bit streams that satisfy the VBV requirements. It is not expected that actual decoders will necessarily be configured or operate in the manner described above. The hypothetical decoder and its associated buffer are simply a means of placing computable limits on the size of compressed pictures.

A rate control scheme can be found in U.S. Pat. No. 5,231,484 to Gonzales and Viscito, which describes a rate control mechanism that can be used for MPEG. A block diagram for this type of scheme is shown in FIG. 2. In this scheme, the input video signal $F_k$ 200 is sent to a Complexity Estimator 201 and a Picture Coder 205. The Complexity Estimator sends a complexity estimate $C_k$ (signal 202) to a Picture Bit Allocator 203. The Picture Bit Allocator sends the quantisation scale $Q_k$ (signal 204) to the Picture Coder 205. The quantisation scale is set depending on the instantaneous buffer fullness of a hypothetical decoder buffer which will be receiving the compressed video signals from the encoder and the complexity of the previously encoded pictures. The Picture Coder uses the quantisation scale to encode $F_k$ and produce an output bit stream $CD_k$ (signal 206).

II. SUMMARY OF THE INVENTION

Because of the above, it is an object of the present invention to provide a system and techniques for encoding Knits of digital information such as pictures so that bit allocation constraints are met while maintaining consistently good quality (e.g. for pictures, visual quality) in the decoded information.

In accordance an aspect of the present invention, units of digital information (coding units) are encoded by modeling coding distortions for each coding unit based on a number of bits assigned. Bits are then assigned to each coding unit in accordance with a set of rules such that the encoding distortion of each coding unit except the first is lower than the encoding distortion of the previous coding unit only if fullness of a model decoder buffer would be below a first number after the removal of the previous coding unit from the decoder buffer; and the encoding distortion of each coding unit except the first is higher than the encoding distortion of the previous coding unit only if the decoder buffer fullness would be above a second number after the removal of the previous coding unit from the decoder buffer. The coding units are encoded based on the assigning.

In various embodiments, methods are provided for allocating bits to pictures in accordance with the VBV constraints for operation at both constant and variable bit rates. The encoding complexity of each picture is modeled based on its spatial and temporal properties. Based on the modeling, a number of bits is allocated in advance to each picture. Each picture is then compressed according to the bits allocated. Based on the difference between the achieved and desired bit rates and on the availability of computational resources, a second pass or multiple passes may be performed to improve the coding.

III. BRIEF DESCRIPTION OF THE DRAWINGS

Figure 9:
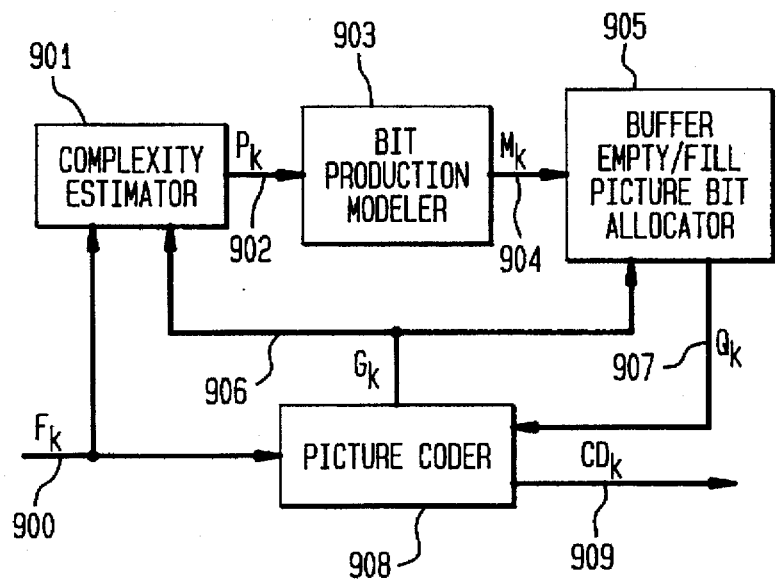
FIG. 9 is an overview of a video compression system according to an embodiment of the present invention.
Figure 26:
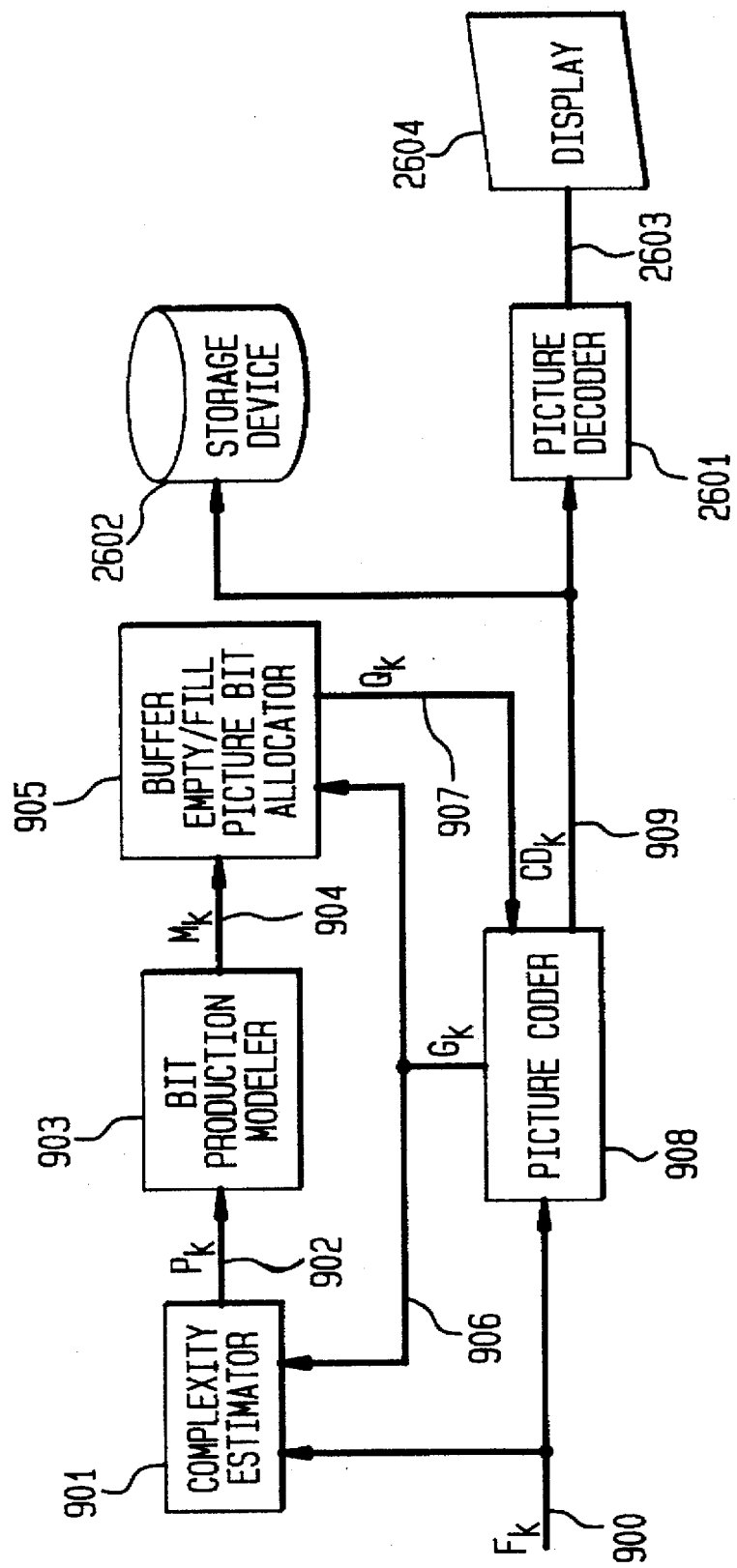

FIG. 21 tabulates the model parameters used in example allocations problems in the text;

FIG. 22 tabulates the computed partial bit allocations for an example constant-bit-rate bit allocation problem;

FIG. 23 tabulates the quantisation scale corresponding to the partial bit allocations of FIG. 22;

FIG. 24 shows the resulting bit allocation for an example constant-bit-rate allocation problem;

FIG. 25 shows the resulting bit allocation for an example variable-bit-rate allocation problem; and, FIG. 26 shows the video compression system of FIG. 9 in the wider context of a video transmission/storage system.

IV. DETAILED DESCRIPTION OF THE PREFERRED EMBODIMENTS a. THE MPEG-2 ENVIRONMENT

As the present invention may be applied in connection with an MPEG-2 encoder, in order to facilitate an understanding of the invention, some pertinent aspects of the MPEG-2 video compression standard will be reviewed. It is to be noted, however, that the invention can also be applied to other video coding algorithms which share some features of the MPEG-2 standard.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings that have minimal length in some sense; and 3) the concatenation of the strings in a well-defined order. Steps 2 and 3 are lossless; i.e., the original data is faithfully recoverable upon reversal. Step 2 is known as entropy coding.

Step 1 can be either lossless or lossy. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 standard for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG video standards specify a coded representation of video for transmission. The standards are designed to operate on interlaced or noninterlaced component video. Each picture has three components: luminance (Y), red color difference ($C_R$), and blue color difference ($C_B$). For 4:2:0 data, the $C_R$ and $C_B$ components each have half as many samples as the Y component in both horizontal and vertical directions. For 4:2:2 data, the $C_R$ and $C_B$ components each have half as many samples as the Y component in the horizontal and direction but the same number of samples in the vertical direction. For 4:4:4 data, the $C_R$ and $C_B$ components each have as many samples as the Y component in both horizontal and vertical directions.

An MPEG data stream consists of a video stream and an audio stream that are packed, with systems information and possibly other bit streams, into a systems data stream that can be regarded as layered. Within the video layer of the MPEG data stream, the compressed data is further layered. A description of the organization of the layers will aid in understanding the invention.

Figure 3:
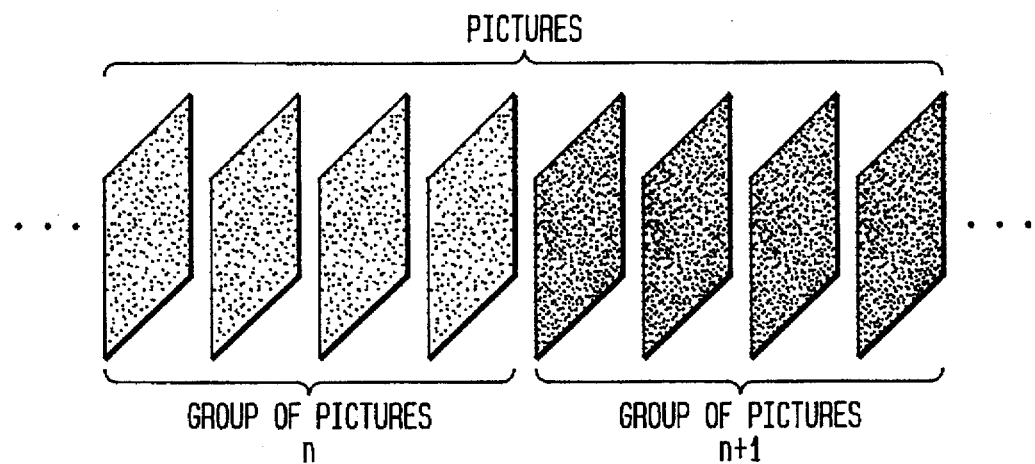
FIG. 3 shows an exemplary set of Group of Pictures (GOP's) layer of compressed data within the video compression layer of an MPEG data stream.

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 3. Decoding may begin at the start of any GOP, essentially independent of the preceding GOP's. There is no limit to the number of pictures that may be in a GOP, nor do there have to be equal numbers of pictures in all GOP's.

Figure 4:
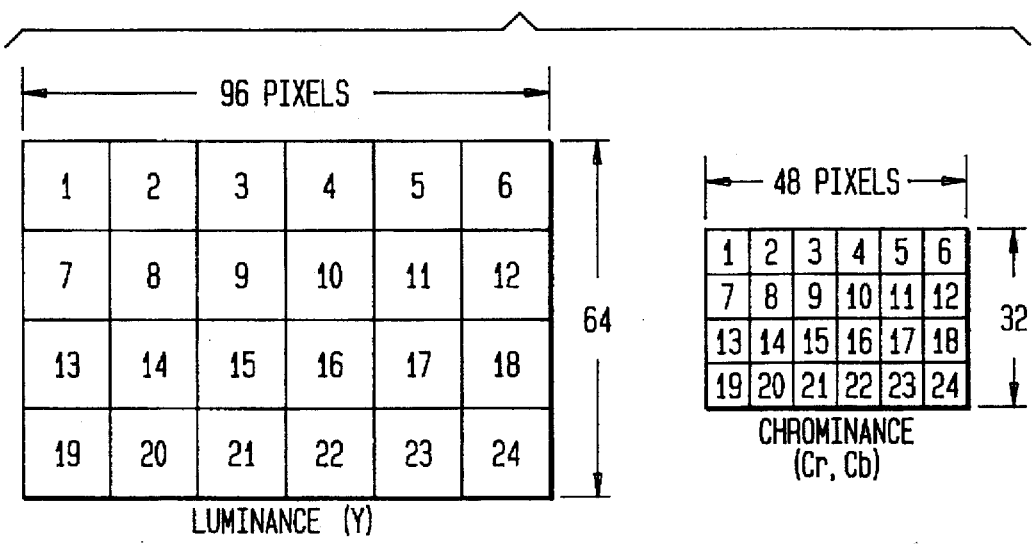
FIG. 4 shows an exemplary Macroblock (MB) subdivision of a picture in the MB layer of compressed data within the video compression layer of an MPEG data stream.

The third or "Picture" layer is a single picture. A general illustration of this layer is shown in FIG. 4. The luminance component of each picture is subdivided into 16×16 regions; the color difference components are subdivided into appropriately sized blocks spatially co-situated with the 16×16 luminance regions; for 4:4:4 video, the color difference components are 16×16, for 4:2:2 video, the color difference components are 8×16, and for 4:2:0 video, the color difference components are 8×8. Taken together, these co-situated luminance region and color difference regions make up the fifth layer, known as "macroblock" (MB). Macroblocks in a picture are numbered consecutively in raster scan order.

Between the Picture and MB layers is the fourth or "Slice" layer. Each slice consists of some number of consecutive MB's. Slices need not be uniform in size within a picture or from picture to picture.

Figure 5:
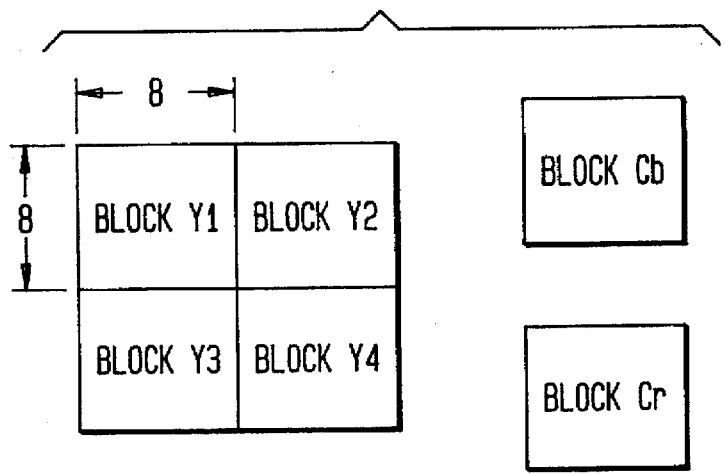
FIG. 5 shows the Block subdivision of a Macroblock.

Finally, as shown in FIG. 5, each MB consists of four 8×8 luminance blocks and 8, 4, or 2 (for 4:4:4, 4:2:2 and 4:2:0 video) chrominance blocks. If the width of the luminance component in picture elements or pixels of each picture is denoted as C and the height as R (C is for columns, R is for rows), a picture is C/16 MB's wide and R/16 MB's high.

The Sequence, GOP, Picture, and Slice layers all have headers associated with them. The headers begin with byte-aligned "Start Codes" and contain information pertinent to the data contained in the corresponding layer.

A picture can be either field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a frame-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of two fields.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2.

Figure 6:
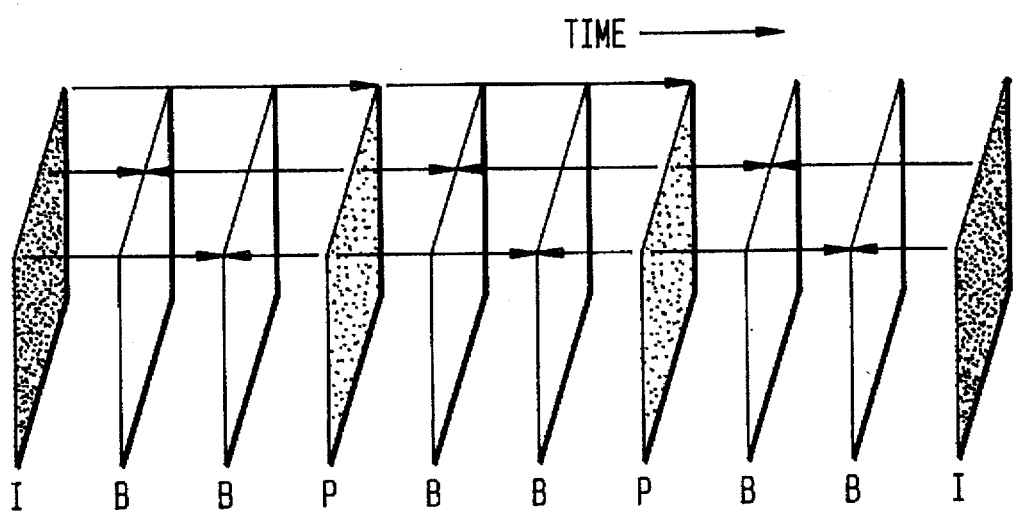
FIG. 6 shows the type of Pictures in a typical Group of Pictures.

Within a GOP, three "types" of pictures can appear. An example of the three types of pictures within a GOP is shown in FIG. 6. The distinguishing feature among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P-pictures) are reconstructed from the compressed data in that picture and two most recently reconstructed fields from previously displayed I- or P-pictures. Bidirectionally motion-compensated pictures (B-pictures) are reconstructed from the compressed data in that picture plus two reconstructed fields from previously displayed I- or P-pictures and two reconstructed fields from I- or P-pictures that will be displayed in the future. Because reconstructed I- or P-pictures can be used to reconstruct other pictures, they are called anchor pictures. For purposes of this specification, an anchor picture is called a terminal picture if the next anchor picture is an I-picture.

One very useful image compression technique is transform coding. In MPEG and several other compression standards, the discrete cosine transform (DCT) is the transform of choice. The compression of an I-picture is achieved by the steps of 1) taking the DCT of blocks of pixels, 2) quantising the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantisation of the DCT coefficients, is the primary source of lossiness in the MPEG standards. Denoting the elements of the two-dimensional array of DCT coefficients by $c_{mn}$, where m and n can range from 0 to 7, aside from truncation or rounding corrections, quantisation is achieved by dividing each DCT coefficient $C_{mn}$ by $W_{mn} \times Q_P$, with $w_{mn}$ being a weighting factor and $Q_P$ being the macroblock quantiser. Note that $Q_P$ is applied to each DCT coefficient. The weighting factor $w_{mn}$ allows coarser quantisation to be applied to the less visually significant coefficients.

There can be several sets of these weights. For example, there can be one weighting factor for I-pictures and another for P- and B-pictures. Custom weights may be transmitted in the video sequence layer, or default values may be used. The macroblock quantiser parameter is the primary means of trading off quality vs. bit rate in MPEG-2. It is important to note that $Q_P$ can vary from MB to MB within a picture. This feature, known as adaptive quantisation (AQ), permits different regions of each picture to be quantised with different step-sizes, and can be used to equalize (and optimize) the visual quality over each picture and from picture to picture. Typically, for example in MPEG test models, the macroblock quantiser is computed as a product of the macroblock masking factor and the picture nominal quantiser.

Following quantisation, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy before coding a picture is motion compensation. MPEG-2 provides several tools for motion compensation (described below).

All the methods of motion compensation have the following in common. For each macroblock, one or more motion vectors are encoded in the bit stream. These motion vectors allow the decoder to reconstruct a macroblock, called the predictive macroblock. The encoder subtracts the predictive macroblock from the macroblock to be encoded to form the difference macroblock. The encoder uses tools to compress the difference macroblock that are essentially similar to the tools used to compress an intra macroblock.

The type of picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used.

Figure 1:
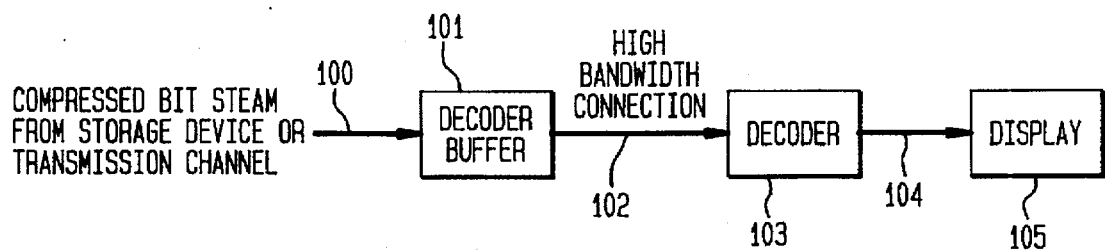
FIG. 1 is a block diagram of a Virtual Buffer Verifier.

The MPEG standards can be used with both constant-bit-rate and variable-bit-rate transmission and storage media. The number of bits in each picture will be variable, due to the different types of picture processing, as well as the inherent variation with time of the spatio-temporal complexity of the scene being coded. The MPEG standards use a buffer-based rate control strategy, in the form of a virtual Buffer Verifier (VBV), to put meaningful bounds on the variation allowed in the bit rate. As depicted in FIG. 1, the VBV is devised as a decoder buffer 101 followed by a hypothetical decoder 103, whose sole task is to place bounds on the number of bits used to code each picture so that the overall bit rate equals the target allocation and the short-term deviation from the target is bounded. The VBV can operate in either constant-bit-rate or variable-bit-rate mode.

In constant-bit-rate mode, the buffer is filled at a constant bit rate with compressed data in a bit stream from the storage or transmission medium. Both the buffer size and the bit rate are parameters that are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 7:
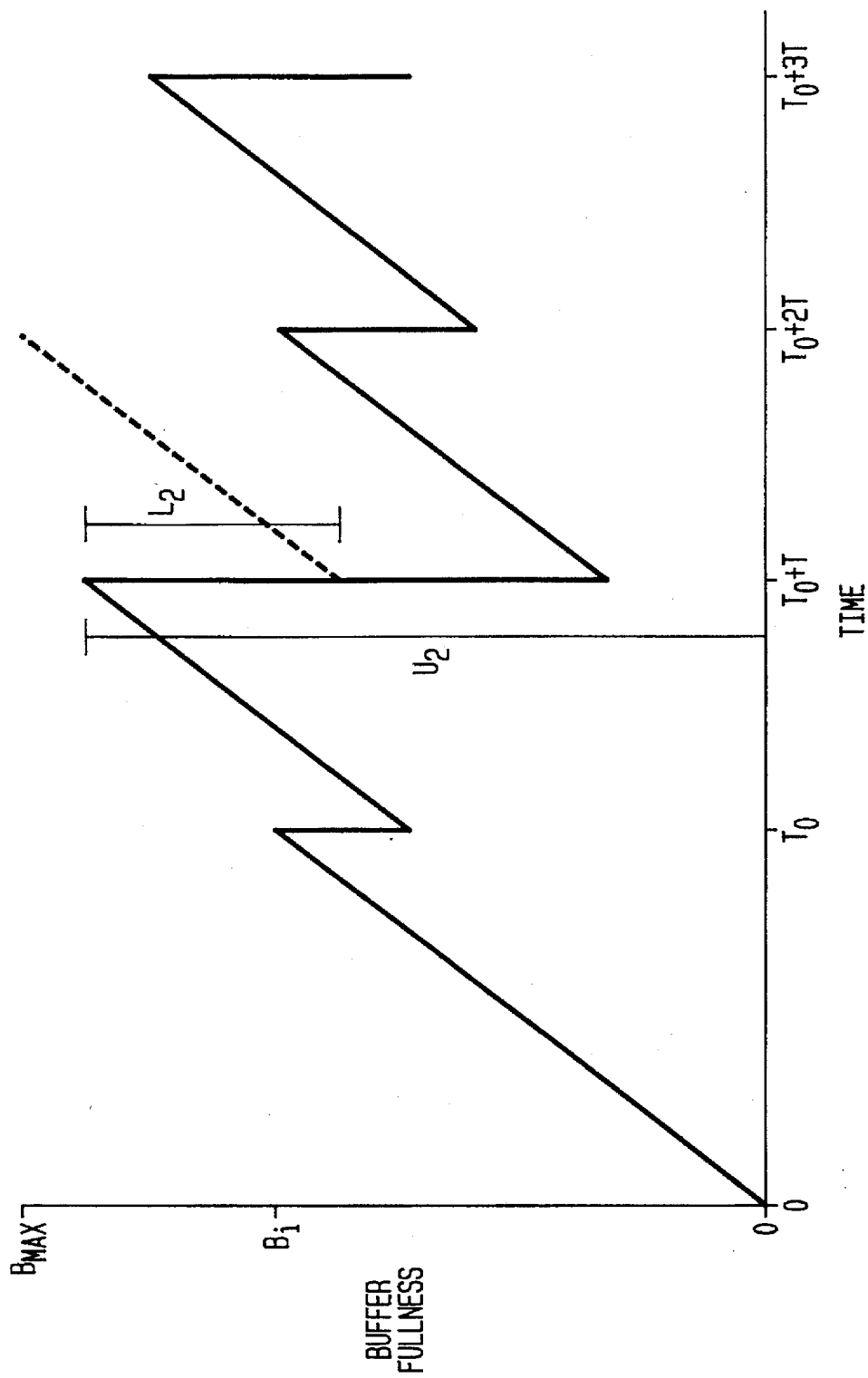
FIG. 7 shows an exemplary plot of the evolution of a virtual decoder buffer over time for operation in constant-bit-rate mode.

The operation of the VBV is shown by example in FIG. 7. The figure depicts the fullness of the decoder buffer over time. The buffer starts with an initial buffer fullness of $B_i$ after an initial delay of time $T_0$. The sloped line segments show the compressed data entering the buffer at a constant bit rate. The vertical line segments show the instantaneous removal from the buffer of the data associated with the earliest picture in the buffer. In this example, the pictures are shown to be removed at a constant interval of time T. In general, the picture display interval, i.e., the time interval between the removal of consecutive pictures, may be variable.

For the bit stream to satisfy the MPEG rate control requirements, it is necessary that all the data for each picture be available within the buffer at the instant it is needed by the decoder and that the decoder buffer does not overfill. These requirements translate to upper and lower bounds on the number of bits allowed in each picture. The upper and lower bounds for a given picture depend on the number of bits used in all the pictures preceding it. For example, the second picture may not contain more than $U_2$ bits since that is the number of bits available in the buffer when the second picture is to be removed, nor less than $L_2$ bits since removing less than $L_2$ bits would result in the buffer overflowing with incoming bits. It is a function of the encoder to produce bit streams that can be decoded by the VBV without error.

For constant-bit-rate operation, the buffer fullness just before removing a picture from the buffer is equal to the buffer fullness just before removing the previous picture minus the number of bits in the previous picture plus the product of the bit rate and the amount of time between removing the picture and the previous picture; i.e., buffer_fullness_before_remove_pic=buffer_fullness_before_remove_last_pic−bits in last_pic+time_between_pic_and_last_pic×bit_rate The upper bound for the number of bits in a picture is equal to the buffer fullness just before removing that picture from the buffer. The lower bound is the greater of zero bits or the buffer size minus the buffer fullness just before removing that picture from the buffer plus the number of bits that will enter the buffer before the next picture is removed. The buffer fullness before removing a given picture depends on the initial buffer fullness and the number of bits in all of the preceding pictures, and can be calculated by using the above rules.

Figure 8:
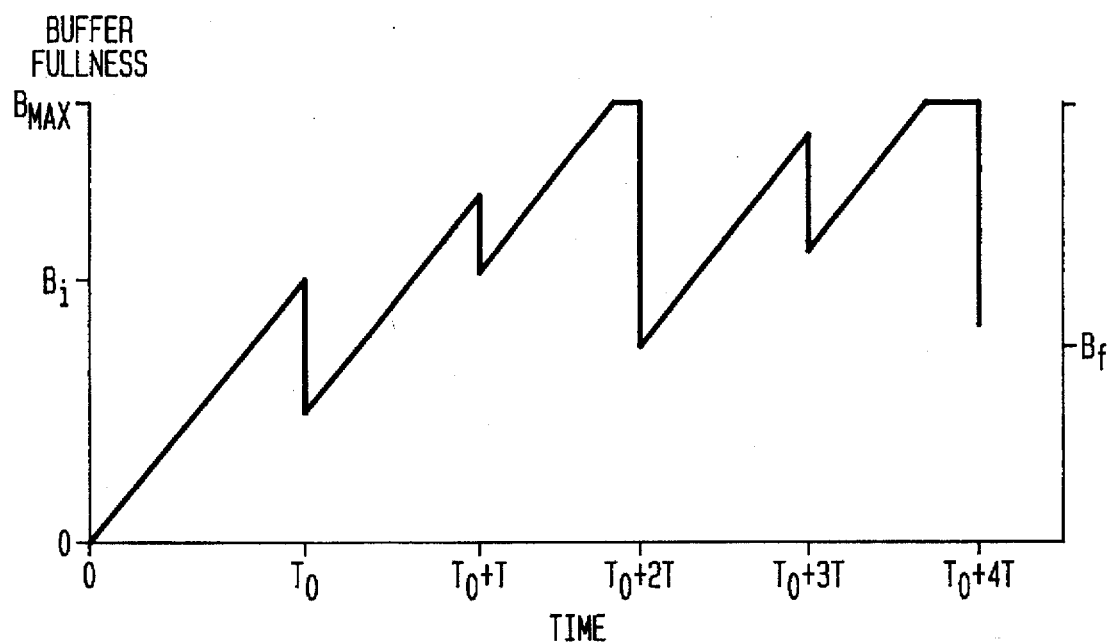
FIG. 8 shows an exemplary plot of the evolution of a virtual decoder buffer over time for operation in variable-bit-rate mode.

Variable-bit-rate operation is similar to the above, except that the compressed bit stream enters the buffer at a specified maximum bit rate until the buffer is full, when no more bits are input. This translates to a bit rate entering the buffer that may be effectively variable, up to the maximum specified rate. An example plot of the buffer fullness under variable-bit-rate operation is shown in FIG. 8. The buffer operates similarly to the constant-bit-rate case except that the buffer fullness, by definition, cannot exceed the buffer size of $B_{max}$. This leads to an upper bound on the number of bits produced for each picture, but no lower bound.

For variable bit rate operation, the buffer fullness just before removing a picture from the buffer is equal to the size of the buffer or to the buffer fullness just before removing the previous picture minus the number of bits in the previous picture plus the maximum bit rate times the amount of time between removing the picture and the previous picture, whichever is smaller; i.e., buffer_fullness_before_remove_pic=min(buffer_size, buffer_fullness_before_remove_last_pic−bits_in_last_pic+time_between_pic_and_last_pic×bit_rate)

The upper bound for the number of bits in a picture is again equal to the buffer fullness just before removing that picture from the buffer. As mentioned, there is no lower bound. The buffer fullness before removing a given picture again depends on the initial buffer fullness and the number of bits in all of the preceding pictures, and can be calculated by using the above rules.

b. Preferred Embodiment of an Encoder

In accordance with an embodiment of the present invention, rate control is based not only on the current state of the buffer but on predicted future states of the buffer after a number of pictures have been encoded. The current and predicted buffer states are used for rate control in a way that differs from conventional methods. In this embodiment, each picture is considered a "coding unit" Bits are allocated to a sequence of pictures so that the quantisation scale $Q_P$ is changed only when the buffer is predicted to reach specified upper and lower limits. Specifically, $Q_P$ is increased only when the decoder buffer is predicted to fill beyond a given threshold and is decreased only when the decoder buffer is predicted to empty beyond a given threshold.

Figure 2:
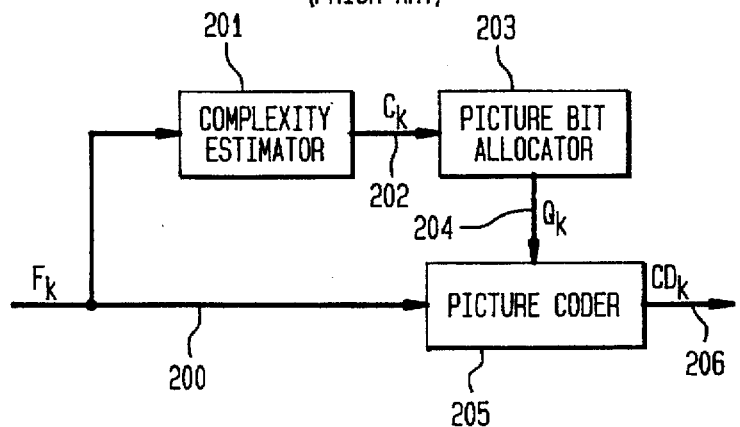
FIG. 2 is an overview of a conventional video compression system.

FIG. 9 shows the components of an embodiment of the present invention and their interconnection. The Picture Coder 908 is of a conventional type, such as the Picture Coder 205 of FIG. 2. The input video signal 900, $F_k$, is input to the Complexity Estimator 901 (CE) and the Picture Coder 908 (PC). (Here, k is a time index.) The CE processes the input video sequence 900 to estimate parameters $P_k$ (signal 902), useful for a modeling of the encoding complexity for each picture. Embodiments of the CE will be described later. The parameters 902 are sent to the Bit Production Modeler 903 (BPM), which constructs models of the number of bits used to encode pictures based on the encoding distortion introduced. The BPM produces models $M_k$ (signal 904) that are sent to the Buffer Empty/Fill Picture Bit Allocator 905 (PBA), which determines the number of bits to allocate to each picture in the video sequence. The operation of the PBA will be described below. In the preferred embodiment, the bit allocation is transmitted to the PC in the form of a quantisation scale $Q_k$ (signal 907). Using the $Q_k$ supplied by the PBA, the PC codes the k-th picture to produce the compressed data $CD_k$ (signal 909). The PC makes coding statistics known to the PBA and the CE through signal 906, $G_k$.

Each of the components of FIG. 9 can be embodied in hardware or as software instantiated in the memory of a general purpose computer. Preferably, the Picture Coder and Complexity Estimator will be embodied as a hardware component or circuit board with associated microcode control, while the Bit Production Modeler and Buffer Empty/Fill Picture Bit Allocator will be embodied in program code.

Figure 10:
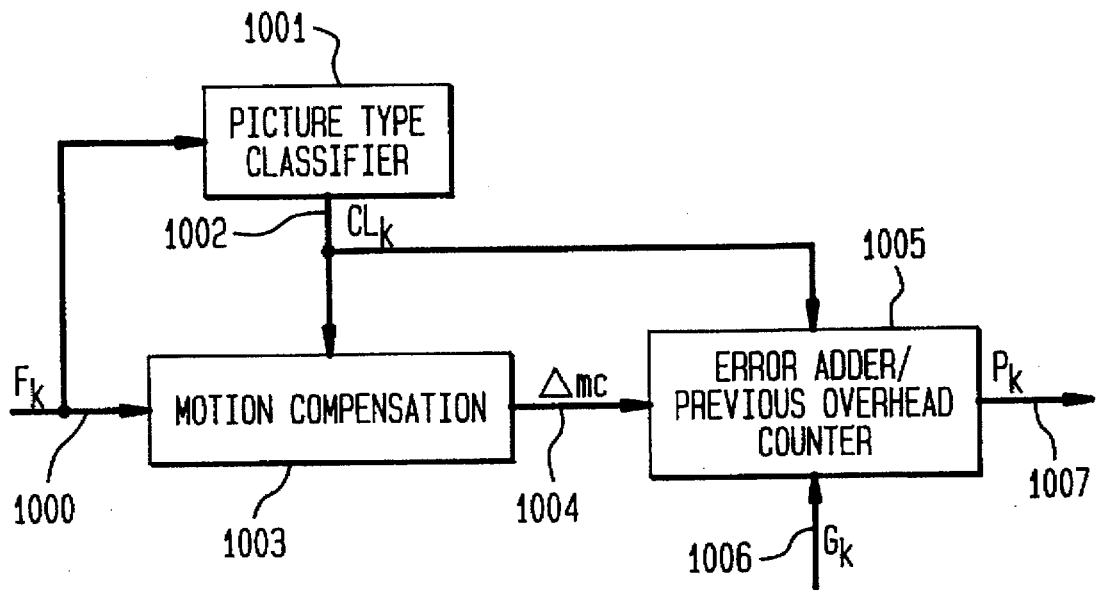
FIG. 10 is a block diagram of an embodiment of the Complexity Estimator of FIG. 9.

One embodiment of the Complexity Estimator 901 is shown in FIG. 10. The input picture 1000, $F_k$, (the same as signal 200, signal 900, and signal 1500) is classified into a picture type by the Picture Type Classifier 1001, and the classification is made known through signal 1002, $CL_k$. Motion compensation is performed by the Motion Compensation unit 1003, producing motion compensation difference Δmc (signal 1004). Techniques for picture classification and motion compensation are known in the art and will not be described in further detail here. Signals 1002 and 1004 are input to the Error Adder and Previous Overhead Counter 1005, which uses them to compute a set of parameters $P_k$ (Signal 1007) to a bit-production model. In this embodiment, $P_k$ consists of a complexity measure, $C_k$, and a overhead, $OH_k$. The Error Adder and Previous Overhead Counter 1005 calculates the complexity for picture k, $C_k$, as the sum of the absolute values of all of the elements of Δmc. It also calculates an overhead estimate for picture k, $OH_k$, as the number of bits used in the previous picture of the same type minus the number of bits used in the previous picture of the same type for representing quantised coefficients.

To better understand how $OH_k$ is calculated, consider the following example. Pictures 1–7 have already been encoded, picture 6 is a P-picture, picture 7 is a B-picture, and picture 8 is a P-picture. Picture 6 used 100,000 bits, of which 90,000 were used for quantised coefficients. Then the predicted overhead for picture 8 is $OH_8$=10,000.

Figure 15:
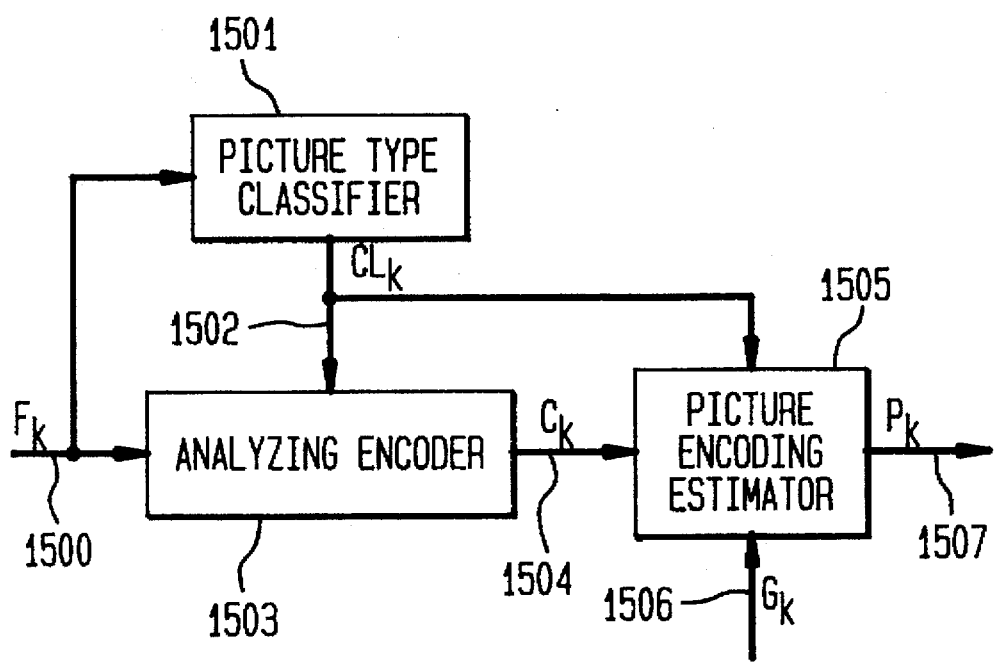
FIG. 15 is a block diagram of a second embodiment of the Complexity Estimator of FIG. 9.

Another embodiment of the Complexity Estimator 901 is shown in FIG. 15. The input picture 1500 is again classified into a picture type by the Picture Type Classifier 1501 (same as unit 1001), and the classification is made known through signal 1502, $CL_k$ (same as signal 1002). The Analyzing Encoder 1503 (AE) compresses each picture. One way to do the compression is to use a conventional encoding method (for example, the algorithm of Gonzales and viscito). A second method is to use a fixed value for quantisation scale in all macroblocks. A third method is to use an encoder that is the subject of this patent (e.g., one based on the Complexity Estimator of FIG. 10.) In any event, the overhead estimate for picture k is set to the number of bits used in the AE for that picture minus the number of bits used to code quantised DCT coefficients. The complexity for picture k is set to the product of the average quantisation scale used in picture k by the AE and the number of bits used to represent the quantized coefficients in picture k by the AE.

Figure 18:
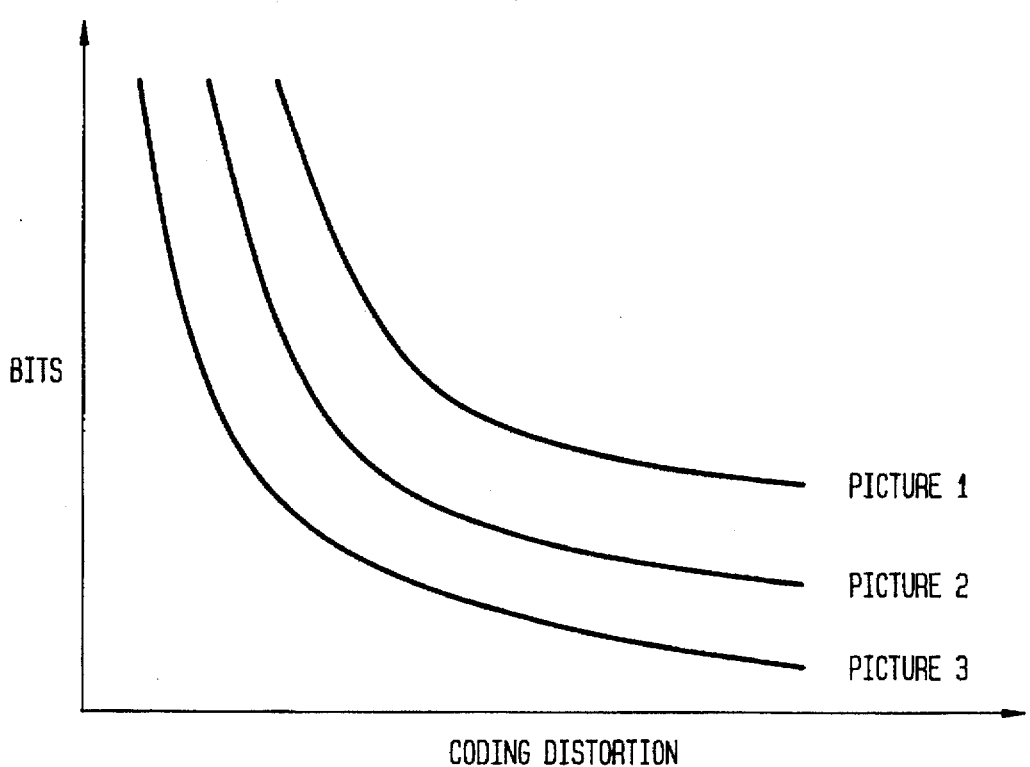
FIG. 18 shows the relationship between encoding distortion and coding bits for three exemplary pictures that are modeled by the Bit Production Modeler in FIG. 9 in an embodiment of the present invention.

The Bit Production Modeler 903 (BPM) relates the number of bits produced by the video coder to the encoding distortion introduced by the compression. In one embodiment, a fixed value of quantisation scale is used in picture k, and that value, $Q_k$, is the encoding distortion measure. An example of the big production models can be seen by reference to FIG. 18. In that figure, we have drawn models for pictures 1–3, showing the number of bits needed to obtain a given level of encoding distortion. Note that for each picture we need more bits for lower levels of distortion, which is typical. In this example, at a given level of coding distortion picture 3 requires the most bits, followed by picture 1 and then 2. We would therefore speak of picture 3 as being the most "complex" and picture 2 as being the least complex.

Many other bit production modelers may be used, and these may use other distortion methods. For example, adaptive quantisation is described in the previously referenced patent by Gonzales and Viscito. By using adaptive quantisation, we can set the quality of a picture by setting a base quantisation level and then modifying the base quantisation level to produce a quantisation scale based on the spatial characteristics of the macroblock. Also, the bit production modeler can define different quantisation levels in different picture types as being equivalent. (For example, a given quantisation level in an I picture might be considered the same quality level as twice that quantisation level in a B frame.)

For any of the above embodiments of a complexity estimator, the Bit Production Modeler 903 operates as follows. The number of bits that are needed for picture k with quantisation scale $Q_k$ is modeled as the sum of the overhead estimate for picture k and the quotient of the complexity for picture k and the quantisation scale for picture k; i.e., $B_k(Q_k) = C_k/Q_k + OH_k$, where $B_k(Q_k)$ is the predicted number of bits needed for the compressed representation of picture k when quantisation scale $Q_k$ is used.

In one embodiment for an encoder, the sequence is compressed many times, and, for each compression pass except the first, the previous pass is used as the Analyzing Encoder 1503.

Figure 11:
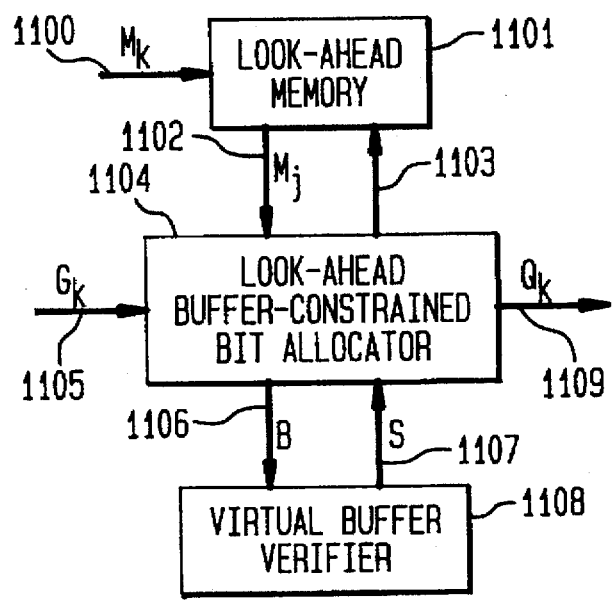
FIG. 11 is a more detailed block diagram of the Buffer Empty/Fill Picture Bit Allocator of FIG. 9.

The Buffer Empty/Fill Picture Bit Allocator 905 is shown in more detail in FIG. 11. The models $M_k$, signal 1100 (same as signal 904), produced by the Bit Production Modeler 903 are stored in the Look-Ahead Memory 1101. The stored models are used by the Look-Ahead Buffer-Constrained Bit Allocator 1104 (LABCBA) to construct a bit allocation for the pictures in the video sequence. The bit allocation is output as quantisation scales $Q_k$ through signal 1109. The LABCBA executes the flow chart in FIG. 12 when operating in constant-bit-rate mode and the flow chart in FIG. 14 for variable-bit-rate mode. The operation of the LABCBA will be described in more detail below. The LABCBA uses Virtual Buffer Verifier 1108 to check for compliance with buffer constraints. In the preferred embodiment, virtual Buffer Verifier 1108 corresponds to the MPEG VBV algorithm. Of course, if the encoder is to be used in another coding environment, the appropriate buffer constraints should be used in the Virtual Buffer Verifier 1108.

For constant-bit-rate operation, the LABCBA determines a bit allocation with the following properties.

1. The encoding distortion at which a picture k is coded is decreased from that of the previous picture k-1, in coding order, only when the buffer is empty after the removal of picture k-1.
2. The encoding distortion at which a picture k is coded is increased from that of the previous picture k-1, in coding order, only when the buffer is full before the removal of picture k.

Figure 16:
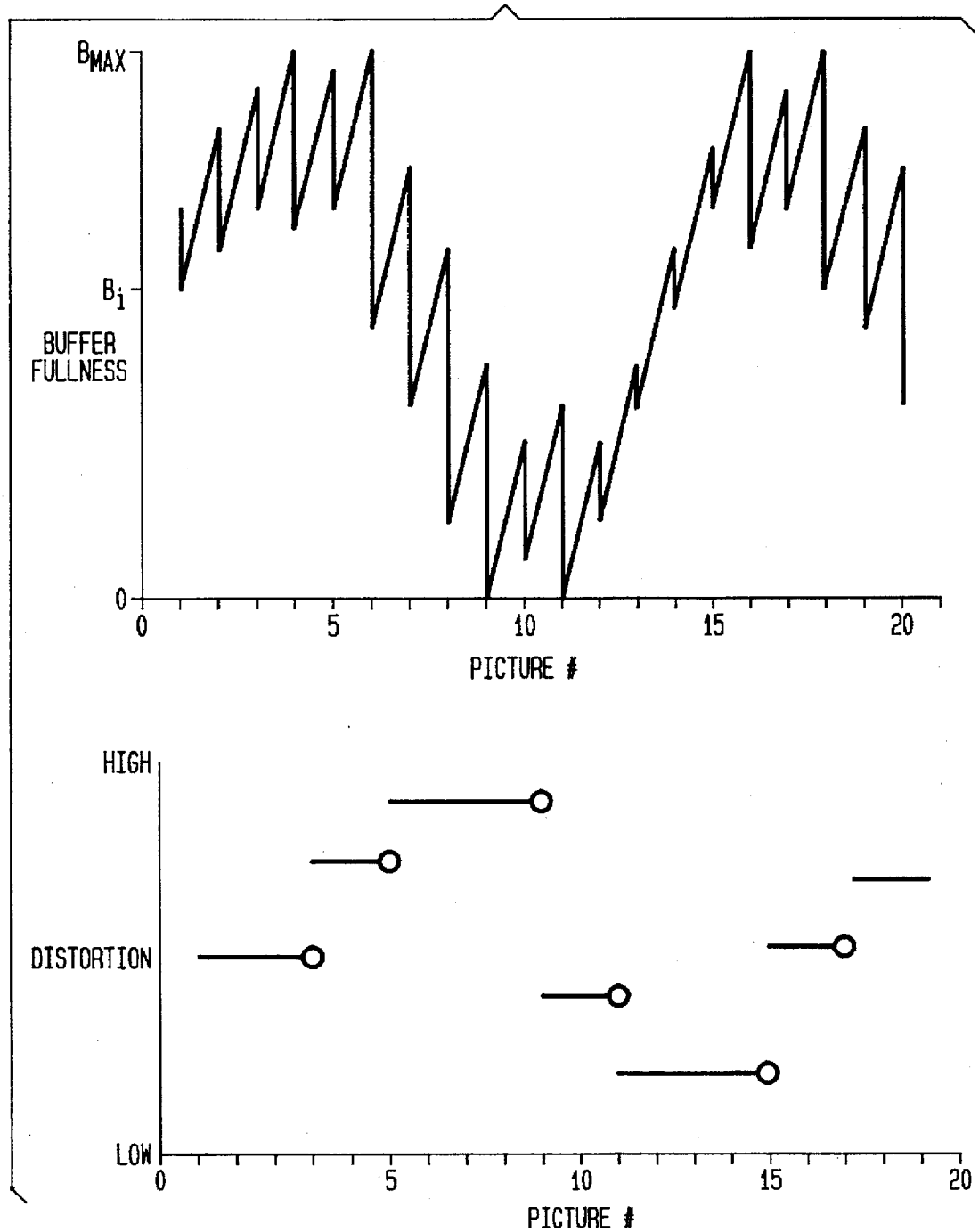
FIG. 16 shows an example of the relationship between the state of the decoder buffer and the encoding distortion that is achieved in the preferred embodiment of the present invention operating in constant-bit-rate mode.

An example of a bit allocation with the above properties is shown with plots of the buffer fullness and corresponding distortion in FIG. 16. In this example, condition 1 applies to pictures 10 and 12, and condition 2 applies to pictures 4, 6, 16, and 18.

For variable-bit-rate operation, the LABCBA determines a bit allocation with the following properties.

3. The encoding distortion at which a picture k is coded is decreased from that of the previous picture k-1, in coding order, only when the buffer is empty after the removal of picture k-1 or when condition 3 would apply.
4. The encoding distortion at which a picture k is coded is increased from that of the previous picture k-1, in coding order, only when the buffer is full before the removal of picture k.
5. The encoding distortion at which a picture k is coded is not more than that of any other picture if after picture k is removed from the buffer, the buffer becomes full with a number of incoming bits that is less than the number of bits transmitted at the peak bit rate during the display interval for picture k.

Figure 17:
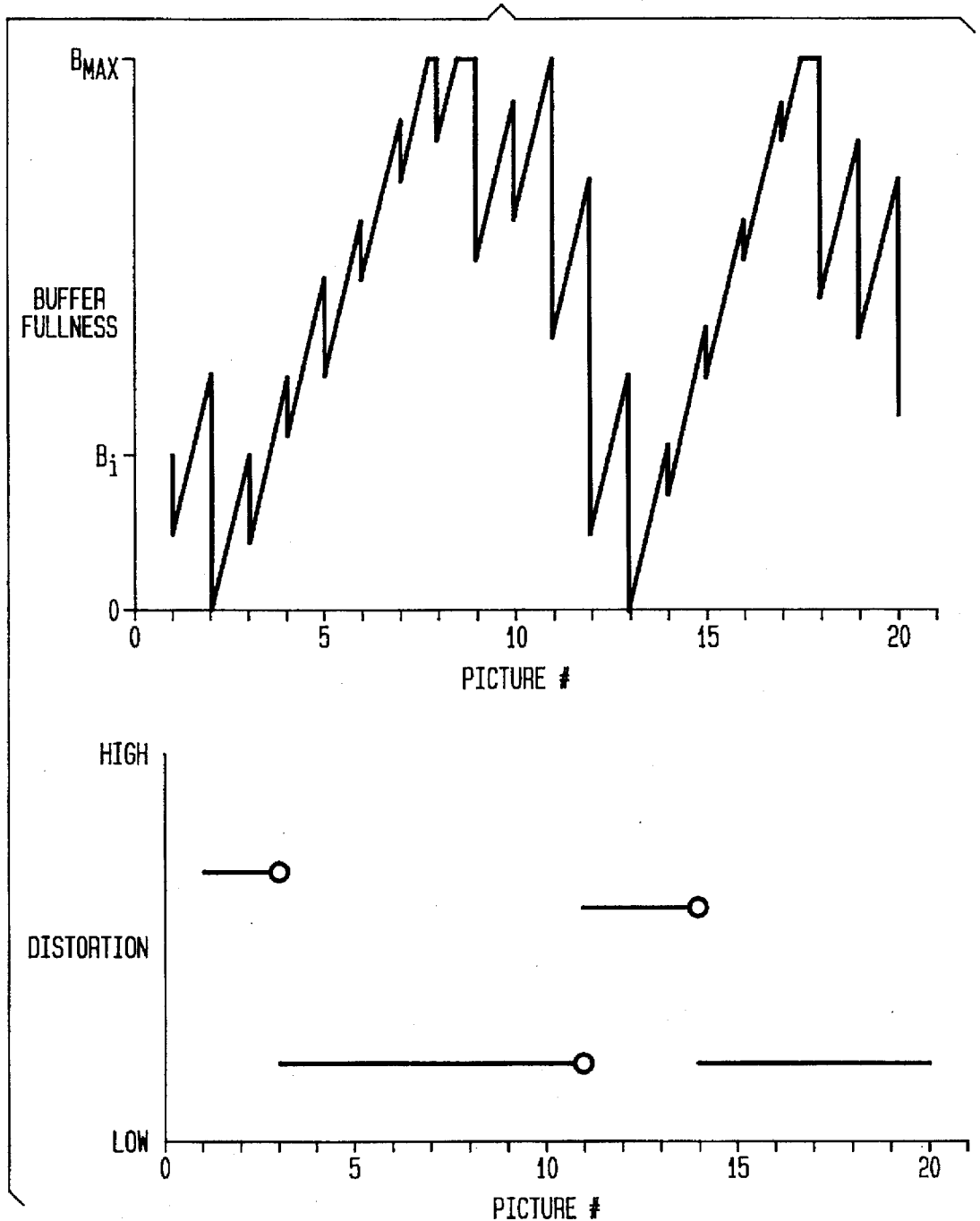
FIG. 17 shows an example of the relationship between the state of the decoder buffer and the encoding distortion that is achieved in the preferred embodiment of the present invention operating in variable-bit-rate mode.

An example of a bit allocation with the above properties (3, 4, and 5) is shown with plots of the buffer fullness and corresponding encoding distortion in FIG. 17. In this example, condition 3 applies to pictures 3 and 14; condition 4 applies to picture 11; and condition 5 applies to pictures 7, 8, and 17.

In the preferred embodiment, encoding distortion is assessed in terms of the quantisation scale $Q_k$ used; a higher $Q_k$ means a greater distortion. The buffer is considered empty when the decoder buffer fullness is at or below a lower threshold, for example 5% of the buffer size. Similarly, the buffer is considered full when the decoder buffer fullness is at or above an upper threshold, for example 95% of the buffer size.

Condition 1 for CBR mode insures that the most decoder buffer space is made available to accumulate future incoming bits when decoding a subsequence of pictures that are, as a group, of lower encoding complexity than the average encoding complexity of the immediately previously encoded pictures, in order to postpone filling the buffer. Condition 2 insures that the most buffer space has been made available to code a subsequence of pictures that are, as a group, of higher encoding complexity than the average encoding complexity of the immediately previously encoded pictures, in order to postpone emptying the buffer.

By way of example, consider the following coding scenario. The input video sequence consists of n pictures, numbered beginning with 1. The initial decoder buffer fullness before picture 1 is removed from the buffer is Bi. The size of the decoding buffer is Bmax. The final buffer fullness after picture n is removed is Bf. In constant-bit-rate mode, the total number of bits to be allocated to coding a video sequence is determined by the length of the sequence, the bit rate, and the initial and final states of the buffer.

Figure 12:
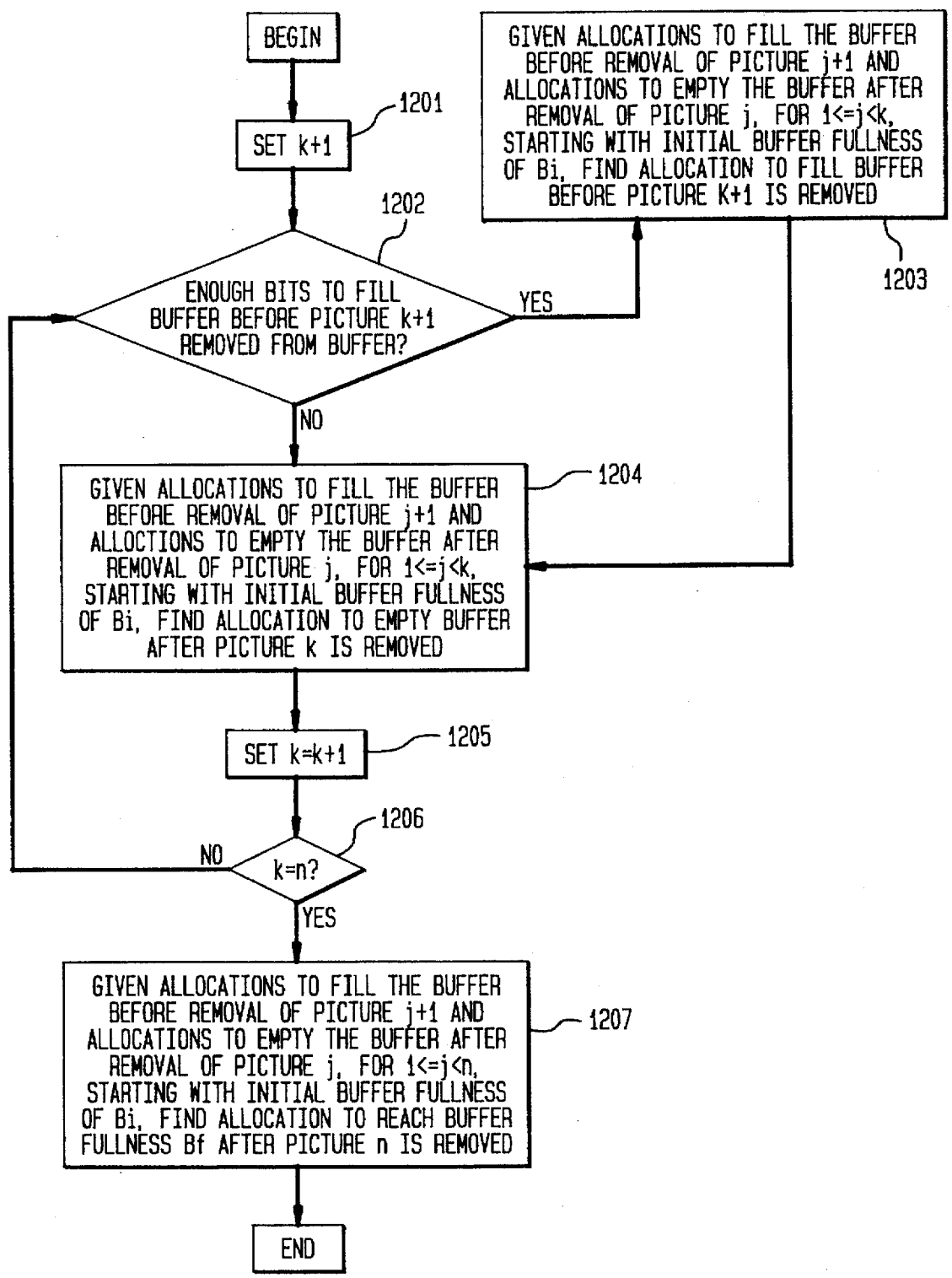
FIGS. 12 and 13 are flow charts showing the operation of the Look-Ahead Buffer Constrained Bit Allocator of FIG. 11 in constant-bit-rate mode (These flow charts are also used as part of the operation of the Look-Ahead Buffer Constrained Bit Allocator in variable-bit-rate mode.)

The operation of the LABCBA in constant-bit-rate mode will now be described by reference to FIG. 12. The LABCBA is preferably embodied as program code.

The loop formed by Steps 1202 to 1206 compute allocations of increasingly longer subsequences of pictures beginning with picture 1. The term "partial allocation" will be used to denote a bit allocation for a subsequence of pictures. In particular, we find allocations for pictures 1 through k, for $1<=k<n$, such that the buffer is empty after removing picture k from the buffer. We also find allocations such that the buffer if full before removing picture k+1 from the buffer (if enough bits are available for an allocation to exist that fills the buffer through k+1 pictures). All these allocations satisfy both conditions for CBR allocations described earlier.

In Step 1201, the picture counter k is set to 1. At this point, the decoder buffer fullness is Bi. Step 1202 tests whether it is possible to allocate any positive number of bits to pictures 1 to k so that the buffer is full before picture k+1 is to be removed. If the answer is yes, then Step 1203 is taken, otherwise Step 1204 is taken.

In Step 1203, a search is performed to find a legal allocation (that does not violate VBV buffer constraints), if one exists, that is constructed from previously computed partial allocations and that results in the buffer being full before picture k+1 is removed. The procedure to do this search is shown in the flow chart in FIG. 13, which will be described later. The partial allocation computed in this step is stored in memory, say in Top[k]. After Step 1203 is completed, Step 1204 is performed.

In Step 1204, a search is performed to find a legal allocation (that does not violate VBV buffer constraints), if one exists, that is constructed from previously computed partial allocations and that results in the buffer being empty after picture k is removed. The partial allocation computed in this step is stored in memory, say in Bot[k]. The procedure to do this search is shown in the flow chart in FIG. 13, which will be described later.

After Step 1204 is completed, the counter k is incremented by 1 in Step 1205. The counter k is then compared to n in Step 1206. If k is not equal to n, then Step 1202 is repeated. If k is equal to n, then Step 1207 is performed.

In Step 1207, a search is performed to find a legal allocation (that does not violate VBV buffer constraints), if one exists, that is constructed from previously computed partial allocations and that results in the buffer being at buffer fullness Bf after picture n is removed. The allocation computed in this step is the bit allocation output by LAB-CBA. The procedure to do this search is shown in the flow chart in FIG. 13, which will be described later.

Steps 1203, 1204, and 1207 all compute a partial allocation that satisfies the two conditions given earlier, with specific starting and ending buffer fullnesses. Moreover, in each case we have to find an allocation ending at a certain picture where we already know allocations ending at the buffer being full or empty at previous pictures. The search procedure is now described with reference to FIG. 13.

The search procedure takes as input four parameters, k_i, k_f, Bii, and Bff. The search procedure computes a bit allocation for pictures k_i to k_f that starts with buffer fullness of Bii before picture k_i is removed and ends with buffer fullness Bff after picture k_f is removed. We already know the allocations, if legal allocations exist, to fill and empty the buffer from pictures k_i to k_f−1. (They are stored in the arrays Top and Bot.)

Step 1301 sets Bt equal to the total number of bits to be allocated to pictures k_i through k_f so that the final buffer fullness after picture k_f is removed will be equal to Bff if the initial buffer fullness is Bii. Step 1302 computes the value for the quantisation scale Q that, when used to code pictures k_i to k_f, will result in Bt number of bits, according to the bit production model output by the Bit Production Modeler 903. Note that the allocation implied by the value of fixed Q may not be legal; it may lead to buffer underflows or overflows. In the preferred embodiment with the bit-production model described earlier, the constant value for Q can be computed as the sum of the complexities $C_k$ for pictures k_i to k_f divided by the difference between the target number of bits Bt and the sum of the overhead $OH_k$ for pictures k_i to k_f.

Step 1303 tests whether the constant-Q allocation is valid according to the virtual Buffer Verifier. If the constant-Q allocation is valid, it is stored as the result and the search terminates. If the constant-Q allocation is not valid, then Step 1305 is executed. In Step 1305, the counter j is set to be equal to k_f.

Step 1306 sets Bt equal to the total number of bits to be allocated to pictures j through k_f so that the final buffer fullness will be Bf if the buffer is empty after picture j-1 is removed. Step 1307 computes the value for the quantisation scale Q that, when used to code pictures j to k_f, will result in Bt number of bits, according to the bit production model output by the Bit Production Modeler. (Again, this allocation may not be legal.) Step 1308 sets the variable lastQ equal to the last value of Q used in the previously computed partial allocation that results in the buffer being empty after picture j-1 is removed: that is, the last value of Q in the partial allocation stored in Bot[j-1].

Step 1309 tests whether the allocation to pictures j through k_f that uses the constant-Q computed in Step 1307 is valid according to the Virtual Buffer Verifier if the buffer fullness is initially empty after removal of picture j-1, and also whether Q is less than lastQ. If both conditions are true, then an allocation is constructed in Step 1310 by concatenating the partial allocation stored in Bot[j-1] to the constant-Q allocation computed in Step 1307; the allocation so constructed is stored as the result and the search ends. (Note that for the final allocation, conditions 1 and 2 for a CBR allocation are true for pictures k_i to j-1 (because for the allocation Bot[] the conditions were true), for pictures j+1 to k_f (because these all use the same Q), and for picture j (because this picture has a lower Q than picture j-1, but the buffer is empty after picture j-1 is removed). Therefore, for the final allocation conditions 1 and 2 hold for all pictures.) If either condition does not hold, then Step 1311 is executed.

Step 1311 sets Bt equal to the total number of bits to be allocated to pictures j through k_f so that the final buffer fullness will be Bf if the buffer is full before picture j is removed. Step 1312 computes the value for the quantisation scale Q that, when used to code pictures j to k_f, will result in Bt number of bits, according to the bit production model output by the Bit Production Modeler 903. Step 1313 sets the variable lastQ equal to the last value of Q used in the previously computed partial allocation that results in the buffer being full before picture j is removed: that is the last value of Q in the partial allocation stored in Top[j-1].

Step 1314 tests whether the allocation to pictures j to k_f that uses the constant-Q computed in Step 1312 is valid according to the Virtual Buffer Verifier if the buffer fullness is initially full before removal of picture j, and whether Q is greater than lastQ. If both conditions are true, then in Step 1315 an allocation is constructed by concatenating the partial allocation stored in Top[j-1] to the constant-Q allocation computed in Step 1312; the allocation so constructed is stored as the result and the search ends. (As with the allocation constructed in Step 1310, the allocation constructed in Step 1315 satisfies conditions 1 and 2 for a CBR allocation). If either condition does not hold, then Step 1316 is executed.

In Step 1316, the counter j is decremented by 1 and the flow of control goes to Step 1317. In Step 1317, the counter j is compared against k_i. If j is greater than k_i then Step 1306 is executed, otherwise the search ends.

A walk-through of the method just described is now provided with a small example. In this example, the video sequence consists of 5 pictures. The pictures are processed by the Complexity Estimator 901, producing the model parameters in the table shown in FIG. 21, which are stored in the Look-Ahead Memory 1101. Unless otherwise noted, numerical values are rounded to two places following the decimal point.

The Virtual Buffer Verifier 1108 operates with the following parameter values. The size, Bmax, of the VBV buffer is 400,000 bits. The initial buffer fullness Bi before removing the first picture is 250,000 bits. The number of bits Ba that enter the buffer per picture display interval is 200,000. The target number of bits Btgt is 1,000,000. Given Bi, Ba, and Btgt, the final buffer fullness Bf after the last picture is removed is 50,000 bits. In this example, the buffer is considered full when its fullness is Bmax and empty when the fullness is 0.

In Step 1201, the picture counter k is set to 1. At this point, the decoder buffer fullness is Bi, or 250,000. Step 1202 tests whether it is possible to allocate any positive number of bits to picture 1 so that the buffer is full before picture 2 is to be removed. Since 200,000 bits enter the buffer within one picture display interval and the buffer fullness is currently 250,000, the test passes and Step 1203 is taken. In Step 1203, a search is performed for an allocation to picture 1 that results in the buffer being full before picture 2 is to be removed. Since there is only one picture in the allocation, this search is trivial, and the details of the steps taken by the flow chart in FIG. 13 will be described later in a more illustrative case. It should be noted, however, that the search procedure is invoked with k_i=1, k_f=1, Bii=250,000, and Bff=200,000. The result of the search is a bit allocation that assigns 50,000 bits to picture 1 using a Q of 136, and this allocation is stored in Top[1].

Figure 13:
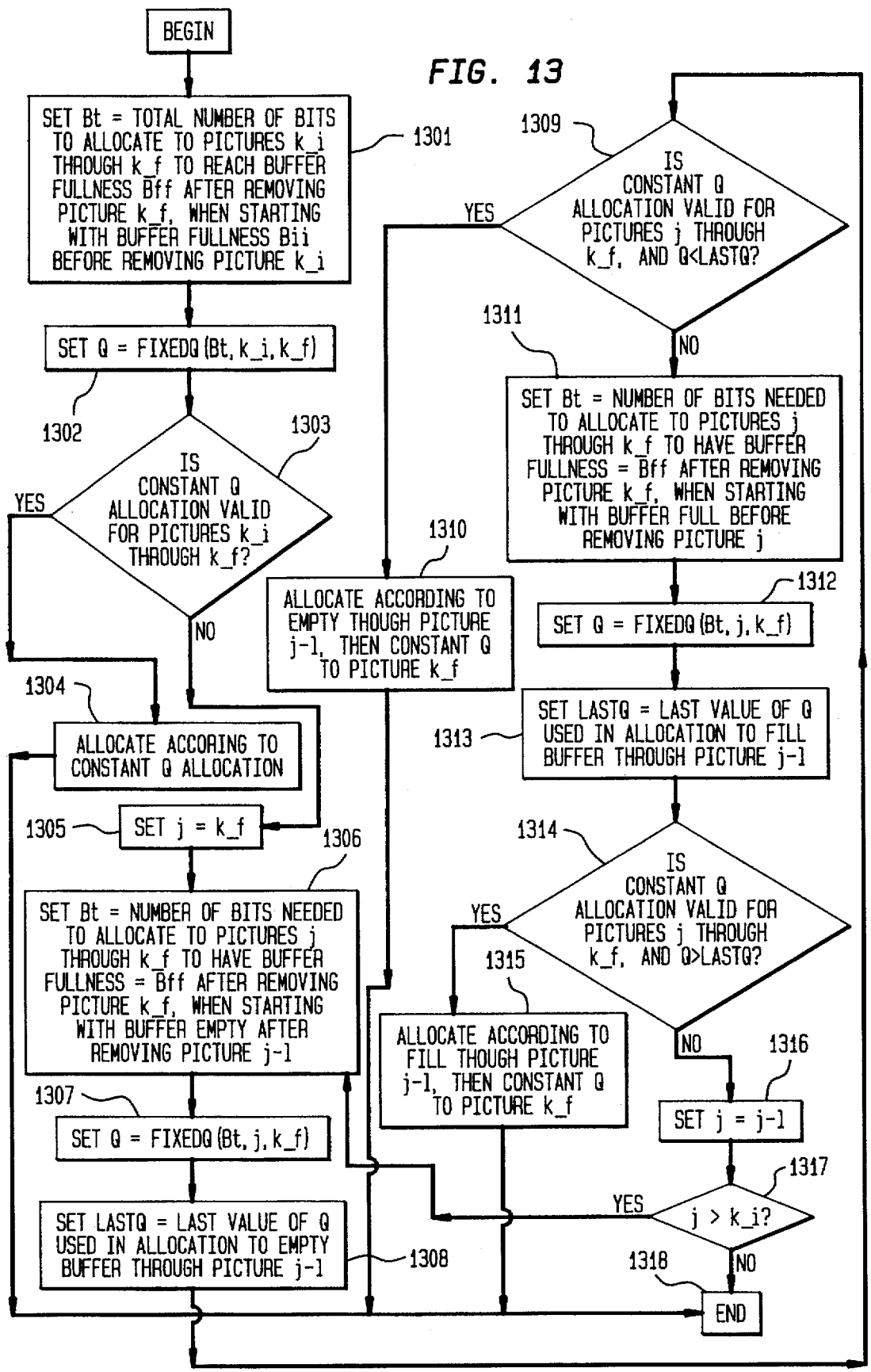

In Step 1204, a search is performed to find a legal allocation that results in the buffer being empty after picture 1 is removed. The search procedure of FIG. 13 is invoked with parameters: k_i=1, k_f=1, Bii=250,000, and Bff=0. The result is an allocation that assigns 250,000 bits to picture 1 using a Q of 8, and this allocation is stored in Bot[1].

After Step 1205, the counter k has value 2. Since k is not equal to 5, Step 1202 is now taken. Since enough bits will have entered the buffer, in the interval when pictures 1 and 2 are to be displayed, to fill the buffer before picture 3 is to be removed, Step 1203 is taken.

The search procedure of FIG. 13 is now invoked with parameters: k_i=1, k_f=2, Bii=250,000, and Bff=200,000. In Step 1301, Bt is calculated to be 250,000. In Step 1302, Q is computed to be 13.47. The bit allocation for pictures 1 to 2 that uses this value of Q does not cause the buffer to overflow or underflow. Therefore Step 1304 is taken, and the constant-Q allocation is returned for pictures 1 to 2. This allocation is stored in Top[2].

In Step 1204, the search procedure in FIG. 13 is now invoked with parameters: k_i=1, k_f=2, Bii=250,000, and Bff=0. In Step 1301, Bt is calculated to be 450,000. In Step 1302, Q is computed to be 6.69. The bit allocation for pictures 1 to 2 that uses this value of Q causes the buffer to underflow. Therefore Step 1305 is taken. The counter j is given the value 2 in this step. In Step 1306, Bt is calculated to be 200,000. In Step 1307, Q is calculated to be 5.19. In Step 1308, lastQ is set to be the last Q used in the allocation stored in Bot[1], which is 8. The allocation for picture 2 that uses the Q computed in Step 1305 is valid, and Q<lastQ. Therefore Step 1310 is taken, and the allocation that is constructed by concatenating Bot[1] with the just-computed constant-Q allocation for picture 2 is returned for pictures 1 to 2. This allocation is stored in Bot[2].

The loop comprising of Steps 1202 to 1206 is executed until k is equal to 5 at Step 1206. The partial allocations computed are given in the tables in FIG. 22, and the corresponding quantisation scales are shown in FIG. 23.

Figure 19:
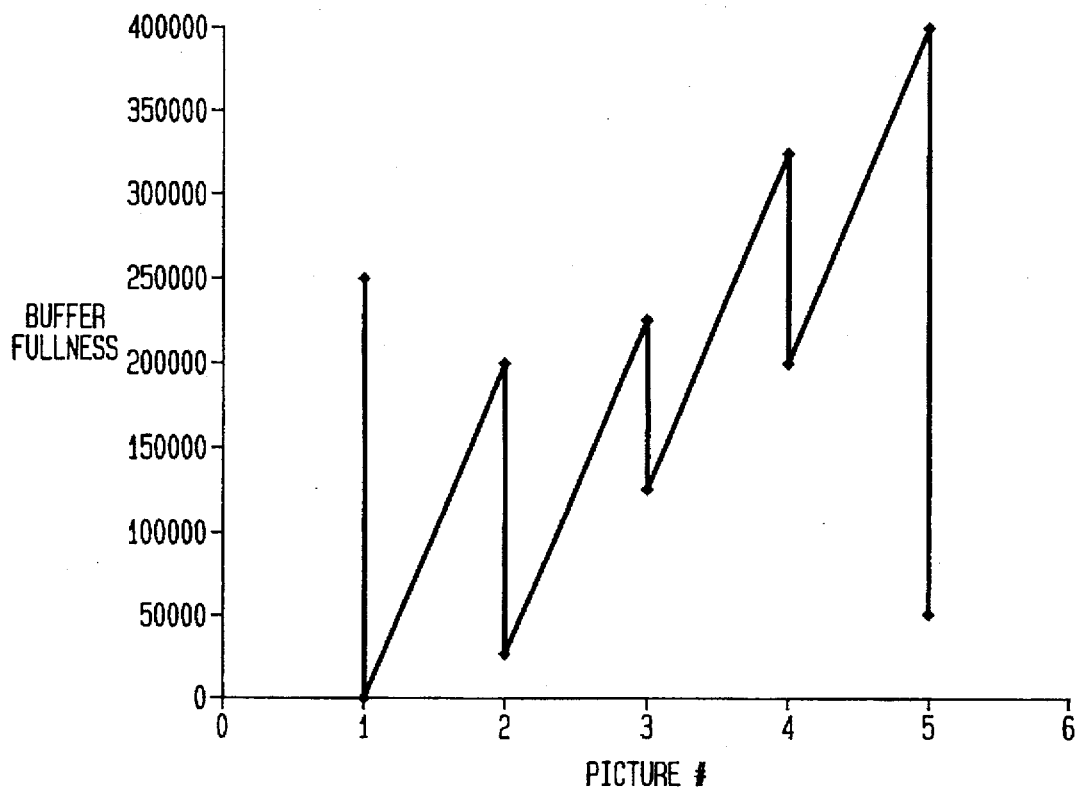
FIG. 19 shows the evolution of the decoder buffer fullness, as predicted by the Look-Ahead Buffer Constrained Bit Allocator in FIG. 11, in an exemplary encoding in constant-bit-rate mode.

In Step 1207, the search procedure of FIG. 13 is now invoked with parameters: k_i=1, k_f=5, Bii=250,000, and Bff=50,000. In Step 1301, Bt is calculated to be 1,000,000. In Step 1302, Q is computed to be 6.84. The bit allocation for pictures 1 to 5 that uses this value of Q causes the buffer to underflow. Therefore Step 1305 is taken. The counter j is given the value 5 in this step. In Step 1306, Bt is calculated to be 190,000. In Step 1307, Q is calculated to be 21. In Step 1308, lastQ is set to be the last Q used in the allocation stored in Bot[4], which is 3.12. The allocation for picture 5 that uses the Q computed in Step 1305 is valid, but Q is not less than lastQ. Therefore Step 1311 is taken. In Step 1311, Bt is calculated to be 350,000. In Step 1312, Q is computed to be 7. In Step 1313, lastQ is set to be the last Q used in the allocation stored in Top[4], which is 6. The allocation for picture 5 that uses the Q computed in Step 1313 is valid, and Q>lastQ. Therefore Step 1315 is taken and the allocation that is constructed by concatenating Top[4] with the just-computed constant-Q allocation for picture 5 is returned for pictures 1 to 5. This allocation (rounded to the nearest integer) is returned by the LABCBA and is shown with the corresponding quantisation scales in FIG. 24. A plot of the evolution of the buffer fullness over time for this allocation is shown in FIG. 19.

Condition 3 for VBR mode insures that the most decoder buffer space is made available to accumulate future incoming bits when decoding a subsequence of pictures that are, as a group, of lower encoding complexity than the average encoding complexity of the immediately previously encoded pictures, in order to postpone filling the buffer. Condition 4 insures that the most buffer space has been made available to code a subsequence of pictures that are, as a group, of higher encoding complexity than the average encoding complexity of the immediately previously encoded pictures, in order to postpone emptying the buffer. If a picture is removed from the buffer and the buffer fills before the next picture is removed, then that picture could have used more bits without changing the buffer fullness before the next picture is removed (as long as not too many bits are added to the picture, the buffer fullness will be Bmax whether extra bit are added or not.) Thus bits can, in a sense, be "added" to such a picture without causing any underflows (although of course the total number of bits used will increase). This means that, in a certain sense, bits can be transferred from anywhere in the sequence to such a picture, so as to make the quality even. It is desired that such a picture not have a greater distortion than any other picture. Condition 5 insures that this will be the case.

The operation of the LABCBA in variable-bit-rate mode will now be described by reference to FIG. 14. The LABCBA is preferably embodied as program code.

In VBR mode, the LABCBA conceptually classifies pictures into two types: "easy" and "hard." The easy pictures are those that will be coded at the best quality level; that is, with the lowest quantisation scale. The hard pictures will be coded at lower quality levels, i.e., higher quantisation scales.

The first picture to be coded is denoted by FIRST and the last picture to be coded is denoted by LAST. The total number of bits to be allocated to pictures FIRST through LAST, inclusively, is denoted as Btgt. The initial buffer fullness is denoted as Binit. Bmax denotes the number of bits for which the buffer is considered full.

In Step 1401, all pictures are marked easy, and the variable Beasy is set to be equal to Btgt. In Step 1402, last_over is set to FIRST-1, bf is set to Binit, and i is set to FIRST. The variable bf denotes the buffer fullness at a point in time.

In Step 1403, a constant-Q allocation is computed for all easy pictures to use Beasy total number of bits.

In Step 1404, picture i is tested to see if it is easy. If picture i is not easy, then bf is set to empty in Step 1405 and execution continues at Step 1415. If picture i is easy, then Step 1406 is taken. In Step 1406, bf is decremented by the number of bits previously allocated to picture i. Then in Step 1407, a check is made to determine whether, given the buffer fullness bf before picture i is removed, the allocation for picture i would cause a buffer underflow after picture i is removed. If a buffer underflow would occur, then in Step 1408, the pictures between last_over+1 and j are marked as hard and a total number of bits is allocated to them corresponding to the number of bits needed to result in an empty buffer after picture j is removed if the buffer is full before picture last_over+1 is removed, assuming a constant-bit-rate mode of operation; the variable bf is set to empty; and execution continues with Step 1410. If the buffer would not underflow, Step 1410 is taken, in which bf is incremented by the number of bits that would enter the buffer after picture i is removed.

In Step 1411, bf is compared to Bmax to see if the buffer would have overflown at this point if bits were to enter the buffer at the peak bit-rate without limit. If so, then bf is set to Bmax, last_over is set to i, and execution continues with Step 1415. If not, then Step 1413 tests picture i+1 to see whether it is hard and whether bf is less than Bmax. If both conditions are true then Step 1414 is taken, otherwise Step 1415 is taken. In Step 1414, the pictures between last_over+1 and j are marked as hard and a total number of bits is allocated to them corresponding to the number of bits needed to result in a full buffer before picture j+1 is removed if the buffer is full before picture last_over+1 is removed, assuming a constant-bit-rate mode of operation; the variable bf is set to empty; bf is set to Bmax if bf is greater than Bmax; and execution continues with Step 1415.

In Step 1415, the counter i is incremented by 1. In Step 1416, i is compared against LAST. If i is not greater than LAST, then execution continues with Step 1404, otherwise Step 1417 is taken. In Step 1417, the difference between the target number of bits Btgt and the sum of the number of bits allocated to the easy and hard pictures is calculated and stored in variable extra_bits. In Step 1418, extra_bits is compared to zero. If extra_bits is not equal to zero, then Beasy is set to be the sum of extra_bits and the number of bits allocated to the easy pictures, and execution continues with Step 1402. Otherwise, Step 1420 is taken.

In Step 1420, each maximal segment of consecutive hard pictures are given an allocation according to the CBR mode using the method described earlier, with the buffer initially full and terminally empty. The resulting bit-allocation at this point is output from the LABCBA.

A walk-through of the method for variable-bit-rate bit allocation just described is now provided with a small example. In this example, the video sequence comprises 5 pictures. The pictures are processed by the Complexity Estimator 901, producing the model parameters in the table in FIG. 21, which are stored in the Look-Ahead Memory 1101. Unless otherwise noted, numerical values are rounded to two places after the decimal point.

The Virtual Buffer Verifier operates with the following parameter values. The size, Bmax, of the VBV buffer is 400,000 bits. The initial buffer fullness Bi before removing the first picture is 250,000 bits. The maximum number of bits Ba that can enter the buffer in one picture display interval is 200,000. The target number of bits is 950,000. In this example, the buffer is considered full when its fullness is Bmax and empty when the fullness is 0.

Figure 14:
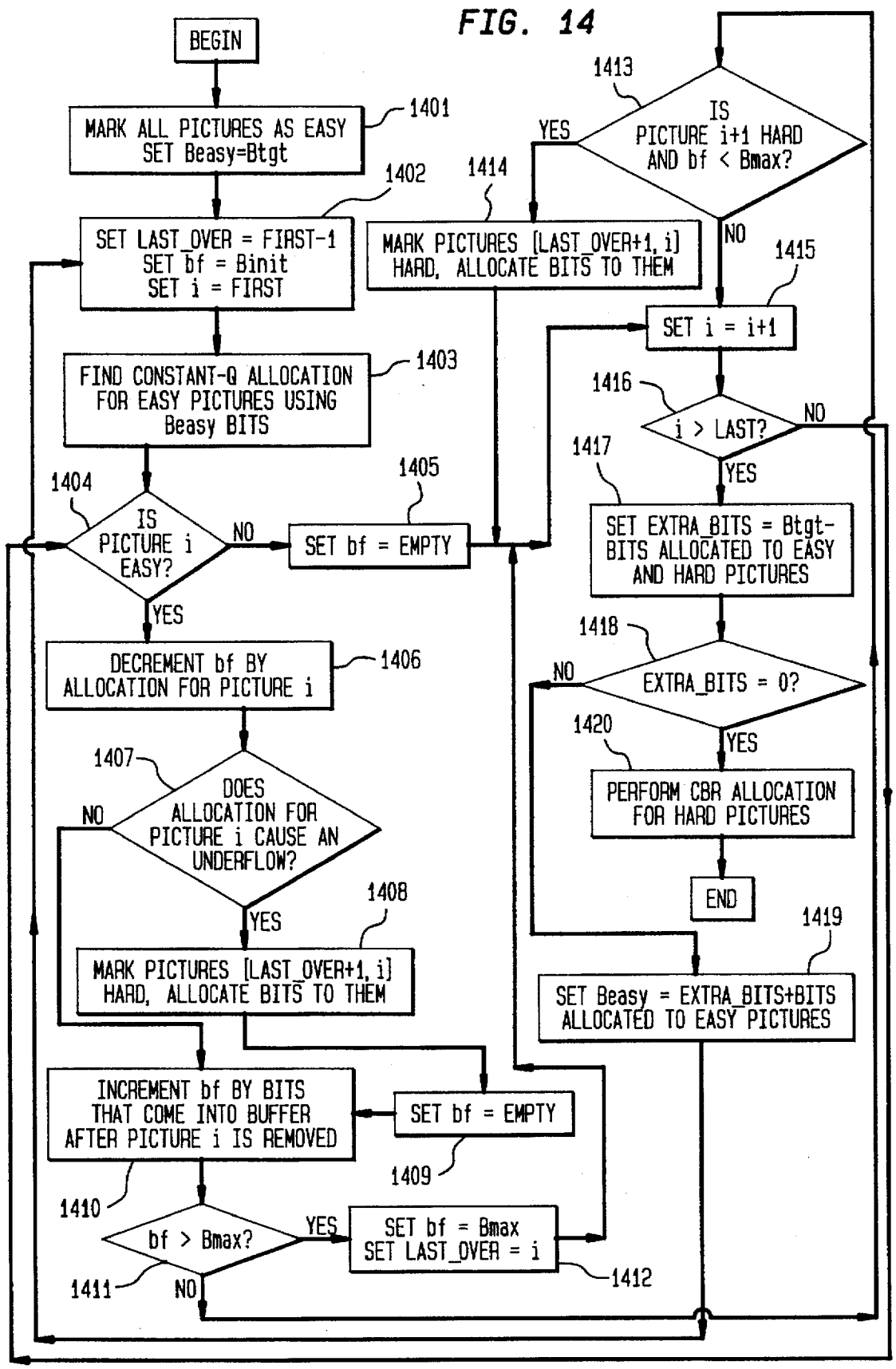
FIG. 14 is a flow chart showing the operation of the Look-Ahead Buffer Constrained Bit Allocator of FIG. 14 in variable-bit-rate mode.

The flow chart in FIG. 14 is referenced with FIRST=1 and LAST=5 and the other parameters as defined above.

In Step 1401, all pictures are marked easy and Beasy is set to 950,000. In Step 1402, last_over is set to 0, bf is set to 250,000, and i is set to 1. In Step 1403, a constant-Q allocation is computed for pictures 1 to 5 to give a total allocation of 950,000 bits. This allocation uses a constant value of Q of 7.26 and assigns 271,610 bits, 147,203 bits, 84,365 bits, 107,627 bits, and 339,195 bits to pictures 1 to 5, respectively. Since picture 1 is currently easy, the test in Step 1404 branches to Step 1406, where bf is decremented by 271,610, the current allocation to picture 1, resulting in a value of bf=−21,610. Since this value is negative, the allocation for picture 1 causes an underflow. Therefore Step 1407 branches to Step 1408, where picture 1 is marked hard and 250,000 bits are allocated to it. (The value of 250,000 is used because that is the maximum number of bits that can be allocated to picture 1 without causing the buffer to underflow. If more than one picture were to be marked hard in this step, the maximum total number of bits that can be allocated to these pictures without causing the buffer to underflow when picture i is removed is distributed to these same pictures in some manner, say evenly.) Step 1409 sets bf to 0, the value for empty in this example, and proceeds to Step 1410. In Step 1410, bf is incremented by 200,000 bits, the maximum number of bits that can enter the buffer in one picture display interval. Since bf is now less than Bmax, the test in Step 1411 branches to Step 1413. Since picture 2 is easy, Step 1415 is taken.

Figure 20:
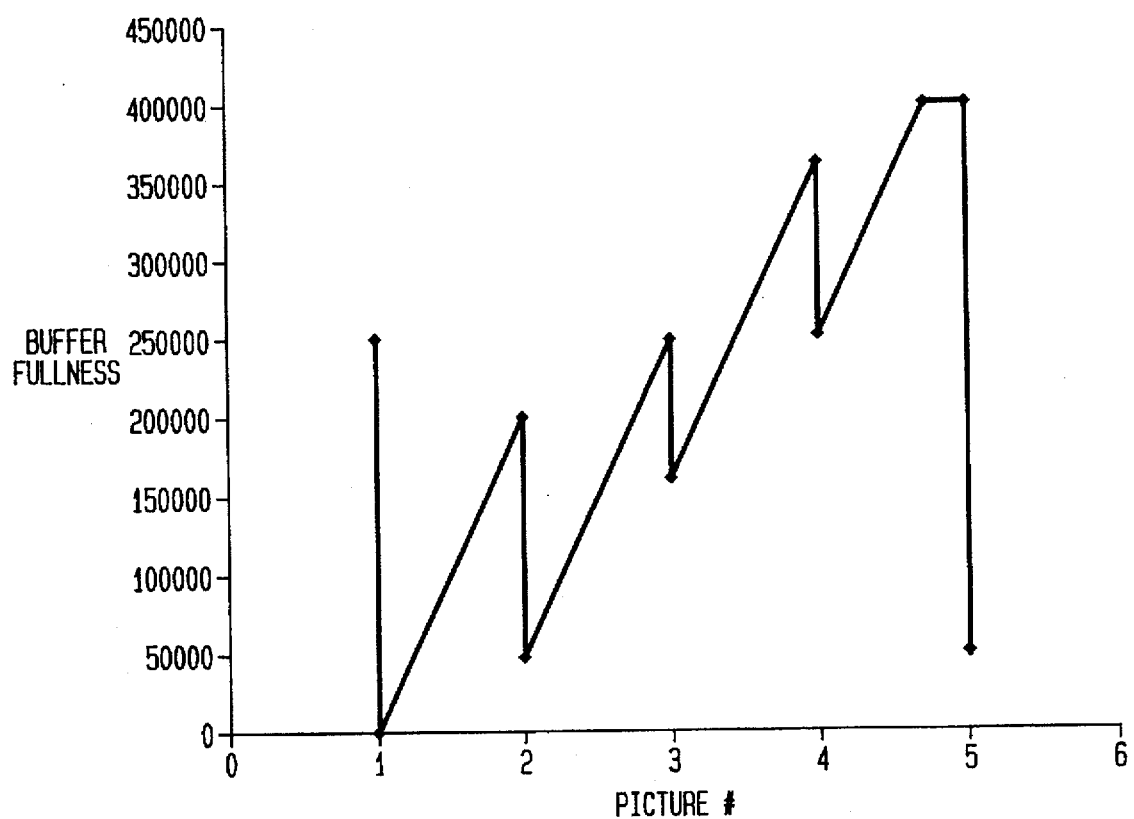
FIG. 20 shows the evolution of the decoder buffer fullness, as predicted by the Look-Ahead Buffer Constrained Bit Allocator in FIG. 11, in an exemplary encoding in variable-bit-rate mode.

The loop consisting of Steps 1404 to 1416 is executed until i is equal to 6 in Step 1416. No other picture is marked hard until this time. Therefore, at this point 678,390 bits have been allocated to easy pictures and 250,000 bits to hard pictures. In Step 1417, extra_bits is computed to be 21,610. Since this value is greater than zero, the test in Step 1418 causes a branch to Step 1419, where Beasy is set to 700,000 bits. The process continues at Step 1402. In Step 1403, a constant Q of 7 is used to allocate bits to the easy pictures, that is, pictures 2 to 5. The loop consisting of Steps 1404 to 1416 executes without any additional picture being mark hard. When Step 1417 is reached, extra_bits is assigned the value 0, and Step 1420 is taken after Step 1418. In Step 1420, the CBR bit allocation procedure described earlier is invoked for maximal subsequences of consecutive hard pictures, with starting and ending buffer fullness as defined by the buffer states immediately before and after each subsequence. In this example, the CBR procedure is invoked for picture 1 with beginning buffer fullness equal to 250,000 bits and ending buffer fullness of 0 bits. Therefore, 250,000 bits is allocated to picture 1 at this point. The resulting allocation (rounded to the nearest integer) and corresponding quantisation is shown in FIG. 25. A plot of the evolution of the buffer fullness over time for this allocation is shown in FIG. 20. Given the bit-allocation from the LABCBA, the Picture Coder 908 proceeds to encode video sequence accordingly.

The encoder of FIG. 9 can be used in an encoding/decoding system as shown in FIG. 26. The encoded bit stream $CD_k$ is either sent to the picture decoder 2601 directly through a transmission medium or else it is first stored in a storage device 2602. The storage device may be, for example, hard (magnetic) drive or a compact disk. The transmission media could be, for example, a coaxial cable or a satellite transmission link. If the compressed bit stream is first sent to a storage device, it is then transmitted to the picture decoder 2601. The picture decoder decodes the bit stream $CD_k$ to produce the video data, shown as signal 2603. The video data is then displayed on the display 2604.

While the invention has been described for MPEG encoding, it can be used with other video coding techniques or even with non-video data. Indeed, any digital information can be segmented into coding units, and bits allocated to the coding units (for fixed rate or variable rate encoding). The coding units can then be encoded based on the allocation. The techniques described for bit allocation will work whether or not the data is video. For example, digitized speech can be segmented into one millisecond frames (these audio frames would play the same role as the video pictures) and bits can be allocated for each millisecond of audio (the coding units).

Now that the invention has been described by way of the preferred embodiment, various modifications and improvements will occur to those skilled in the art. Thus, it should be understood that the preferred embodiment has been provided as an example and not as a limitation. The scope of the invention is defined by the appended claims.

We claim:

1. A method for encoding of ordered coding units comprising the steps of:

modeling coding distortions for each coding unit based on a number of bits assigned;

assigning a number of bits to each coding unit in accordance with a set of rules such that the encoding distortion of each coding unit except the first is lower than the encoding distortion of the previous coding unit only if fullness of a model decoder buffer would be below a first number after the removal of the previous coding unit from the decoder buffer; and the encoding distortion of each coding unit except the first is higher than the encoding distortion of the previous coding unit only if the decoder buffer fullness would be above a second number after the removal of the previous coding unit from the decoder buffer; and, encoding at least one of the coding units based on the assigning.

2. The method of claim 1, wherein the data is video data.

3. The method of claim 2, wherein the coding units are pictures.

4. The method of claim 2 wherein the modeling comprises the steps of encoding a video sequence and based on the encoding, modeling coding distortions of portions of the sequence based on a number of bits assigned.

5. The method of claim 2 wherein the modeling comprises the steps of performing motion compensation on a video sequence and based on the motion compensation, modeling coding distortions of portions of the sequence based on a number of bits assigned.

6. The method of claim 2 wherein the distortion is the quantisation level.

7. A method for encoding of ordered coding units comprising the steps of:

modeling coding distortions for each coding unit in a set of coding units based on a number of bits assigned;

assigning a first number of bits among a subset of the coding units in accordance with a set of rules such that the encoding distortion of each coding unit except the first in the subset is lower than the encoding distortion of the previous coding unit in the subset only if fullness of a model decoder buffer would be below a first threshold after the removal of the previous coding unit in the subset from the decoder buffer; and the encoding distortion of each unit in the subset except the first is higher than the encoding distortion of the previous coding unit in the subset only if the decoder buffer fullness would be above a second threshold after the removal of the previous coding unit in the subset from the decoder buffer;

responsive to the assigning of the first number of bits, assigning a second number of bits among all coding units in accordance with a set of rules such that the encoding distortion of each coding unit except the first is lower than the encoding distortion of the previous coding unit only if the decoder buffer fullness would be below a third threshold after the removal of the previous coding unit from a decoder buffer; and the encoding distortion of each unit except the first is higher than the encoding distortion of the previous coding unit only if the decoder buffer fullness would be above a fourth threshold after the removal of the previous coding unit from the buffer; and, encoding at least one of the coding units based on the assigning.

8. The method of claim 7, wherein the data is video data.

9. The method of claim 8, wherein the coding units are pictures.

10. An apparatus for encoding information, comprising:

a bit production modeler for modeling coding distortion versus bit usage of each coding unit to be encoded;

an allocator, connected to receive an output from the bit production modeler, for allocating bits to each coding unit in accordance with a set of rules such that the encoding distortion of each coding unit except the first is lower than the encoding distortion of the previous coding unit only if fullness of a model decoder buffer would be below a first number after the removal of the previous coding unit from the decoder buffer; and the encoding distortion of each coding unit except the first is higher than the encoding distortion of the previous coding unit only if the decoder buffer fullness would be above a second number after the removal of the previous coding unit from the decoder buffer; and, an encoder, connected to receive an output from the bit allocator.

11. A method for variable bit rate bit encoding of ordered coding units comprising the steps of:

modeling coding distortions for each coding unit based on a number of bits assigned;

assigning a number of bits to each coding unit in accordance with a set of rules such that the encoding distortion of each coding unit except the first is lower than the encoding distortion of the previous coding unit only if fullness of a model decoder buffer would be below a first number after the removal of the previous coding unit from the decoder buffer; and the encoding distortion of each coding unit except the first is higher than the encoding distortion of the previous coding unit only if the decoder buffer fullness would be above a second number after the removal of the previous coding unit from the decoder buffer; and the encoding distortion of each coding unit except the last is not lower than the encoding distortion of any other coding unit if the decoder buffer fullness would be above a third number before the removal of the next coding unit from the decoder buffer; and, encoding at least one of the coding units based on the assigning.

12. The method of claim 11, wherein the data is video data.

13. The method of claim 12, wherein the coding units are pictures.

14. The method of claim 12 wherein the modeling comprises the steps of encoding a video sequence and based on the encoding, modeling coding distortions of portions of the sequence based on a number of bits assigned.

15. The method of claim 12 wherein the modeling comprises the steps of performing motion compensation on a video sequence and based on the motion compensation, modeling coding distortions of portions of the sequence based on a number of bits assigned.

16. The method of claim 12 wherein the distortion is the quantisation level.

17. A method for variable bit rate bit encoding of ordered coding units comprising the steps of:

modeling coding distortions for each coding unit in a set based on a number of bits assigned;

segmenting the coding units into a first set of coding units such that each coding unit in the first set will have an encoding distortion not greater than the encoding distortion of any other coding unit and a second set containing all other coding units;

assigning a number of bits to each coding unit in the second set in accordance with a set of rules such that the encoding distortion of each coding unit in the second set that follows another coding unit in the second set is lower than the encoding distortion of the another coding unit only if fullness of a model decoder buffer would be below a first number after the removal of the another coding unit from the decoder buffer; and the encoding distortion of each coding unit in the second set that follows another coding unit in the second set is higher than the encoding distortion of the another coding unit only if the decoder buffer fullness would be above a second number after the removal of the another coding unit from the buffer;

assigning bits not used for the second set of coding units among the first set of coding units; and, encoding at least one of the coding units based on the assigning.

18. The method of claim 17, wherein the data is video data.

19. The method of claim 18, wherein the coding units are pictures.

20. An apparatus for variable rate encoding information, comprising:

a bit production modeler for modeling coding distortion versus bit usage of each coding unit to be encoded;

an allocator, connected to receive an output from the bit production modeler, for allocating bits to each coding unit in accordance with a set of rules such that the encoding distortion of each coding unit except the first is lower than the encoding distortion of the previous unit only if fullness of a model decoder buffer would be below a first number after the removal of the previous coding unit from the decoder buffer; and the encoding distortion of each coding unit except the first is higher than the encoding distortion of the previous coding unit only if the decoder buffer fullness would be above a second number after the removal of the previous coding unit from the decoder buffer; and the encoding distortion of each coding unit except the last is not lower than the encoding distortion of any other coding unit if the decoder buffer fullness would be above a third number before the removal of the next coding unit from the decoder buffer;

an encoder, connected to receive the output from the bit allocator.

* * * * *